US007880810B2

(12) United States Patent
Oshima et al.

(10) Patent No.: US 7,880,810 B2

(45) Date of Patent: Feb. 1, 2011

(54) APPARATUS AND METHOD FOR PROCESSING INFORMATIONAL SIGNAL

(75) Inventors: Takuya Oshima, Tokyo (JP); Yoshihiro Wakita, Tokyo (JP); Seiji Wada, Kanagawa (JP); Naoki Tagami, Tokyo (JP)

(73) Assignee: Sony Corporation, Tokyo (JP)

( * ) Notice: Subject to any disclaimer, the term of this patent is extended or adjusted under 35 U.S.C. 154(b) by 1188 days.

(21) Appl. No.: 11/498,816

(22) Filed: Aug. 4, 2006

(65) Prior Publication Data

US 2007/0044136 A1 Feb. 22, 2007

(30) Foreign Application Priority Data

Aug. 17, 2005 (JP) ............................ 2005-236794

(51) Int. Cl.
*H04N 9/475* (2006.01)

(52) U.S. Cl. ...................................................... 348/515

(58) Field of Classification Search ......... 348/515–520, 348/725; 707/104.1; 382/100, 276
See application file for complete search history.

(56) References Cited

U.S. PATENT DOCUMENTS

| | | | | |
|---|---|---|---|---|
| 6,757,693 | B2 * | 6/2004 | Taniguchi et al. | 382/276 |
| 6,977,679 | B2 * | 12/2005 | Tretter et al. | 348/231.2 |
| 6,987,539 | B2 | 1/2006 | Kondo et al. | |
| 7,103,230 | B1 * | 9/2006 | Jam et al. | 382/276 |
| 7,366,406 | B2 * | 4/2008 | Hoshino et al. | 386/125 |
| 7,474,759 | B2 * | 1/2009 | Sternberg et al. | 382/100 |
| 7,623,176 | B2 * | 11/2009 | Hoshino et al. | 348/333.02 |
| 2006/0153473 | A1 * | 7/2006 | Ruggiero | 382/276 |

FOREIGN PATENT DOCUMENTS

| | | |
|---|---|---|
| JP | 7-135620 | 5/1995 |
| JP | 7-170466 | 7/1995 |
| JP | 9-219843 | 8/1997 |
| JP | 2001-238185 | 8/2001 |
| JP | 2002-165210 | 6/2002 |
| JP | 3363036 | 10/2002 |
| JP | 2004-015553 | 1/2004 |

* cited by examiner

*Primary Examiner*—Paulos M Natnael
(74) *Attorney, Agent, or Firm*—Oblon, Spivak, McClelland, Maier & Neustadt, L.L.P.

(57) ABSTRACT

An apparatus for processing an informational signal includes a first processing section for receiving the informational signal, executing a first processing on the informational signal, and outputting the processed informational signal. The apparatus also includes a second processing section, which is located at a posterior stage of the first processing section, for receiving the processed informational signal and executing a second processing on the processed informational signal. The apparatus further includes transmitting device for transmitting meta-information corresponding to each predetermined period of time in the informational signal from the first processing section to the second processing section. The processing in the second processing section is controlled based on the meta-information transmitted by the transmitting device.

9 Claims, 17 Drawing Sheets

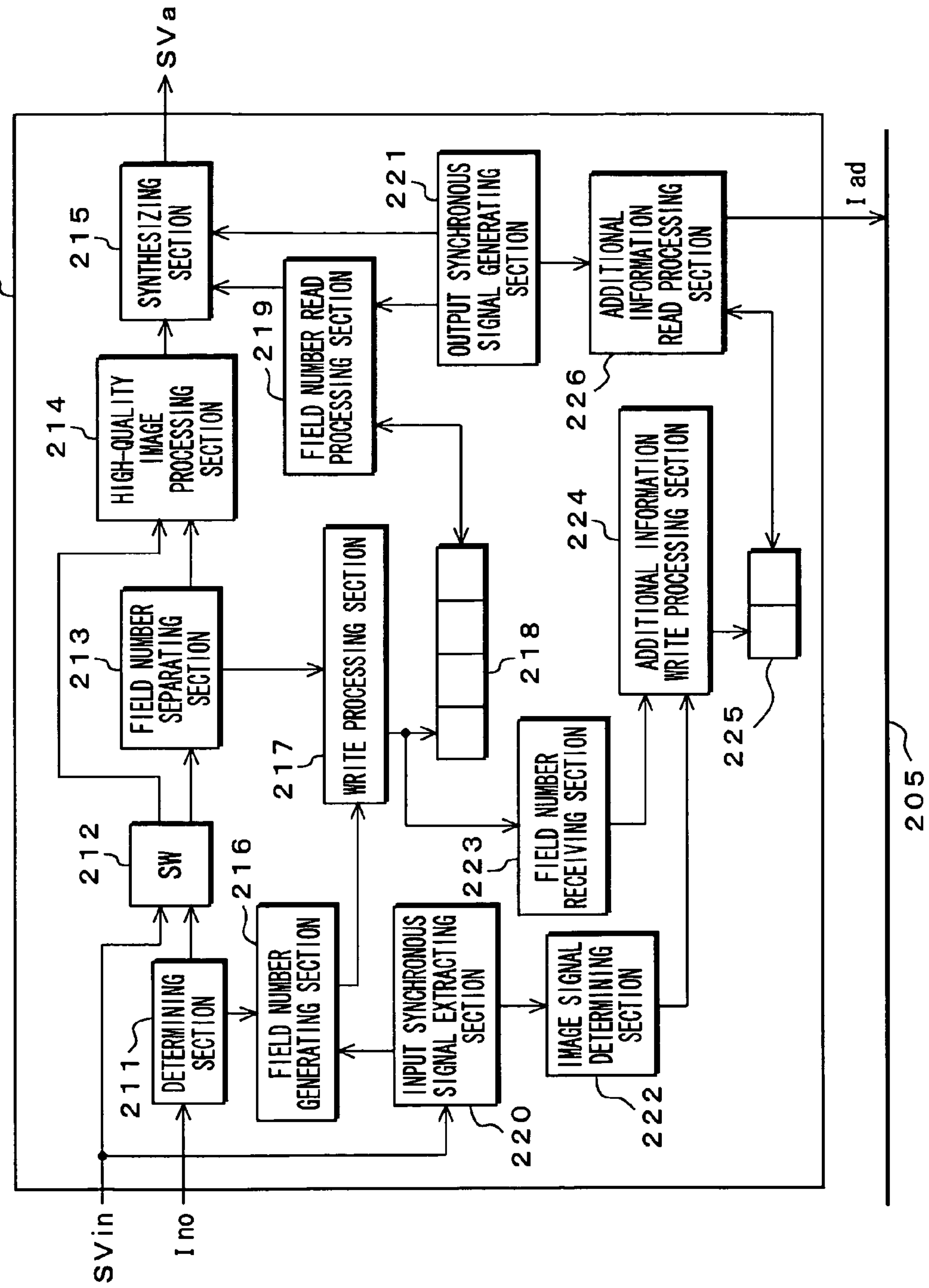
FIG. 5
201
SVa
215
SYNTHESIZING SECTION
221
OUTPUT SYNCHRONOUS SIGNAL GENERATING SECTION
ADDITIONAL INFORMATION READ PROCESSING SECTION
I ad
214
HIGH-QUALITY IMAGE PROCESSING SECTION
219
FIELD NUMBER READ PROCESSING SECTION
226
224
ADDITIONAL INFORMATION WRITE PROCESSING SECTION
213
FIELD NUMBER SEPARATING SECTION
WRITE PROCESSING SECTION
218
217
225
205
212
SW
216
223
FIELD NUMBER RECEIVING SECTION
211
DETERMINING SECTION
FIELD NUMBER GENERATING SECTION
INPUT SYNCHRONOUS SIGNAL EXTRACTING SECTION
220
IMAGE SIGNAL DETERMINING SECTION
222
SVin
I no

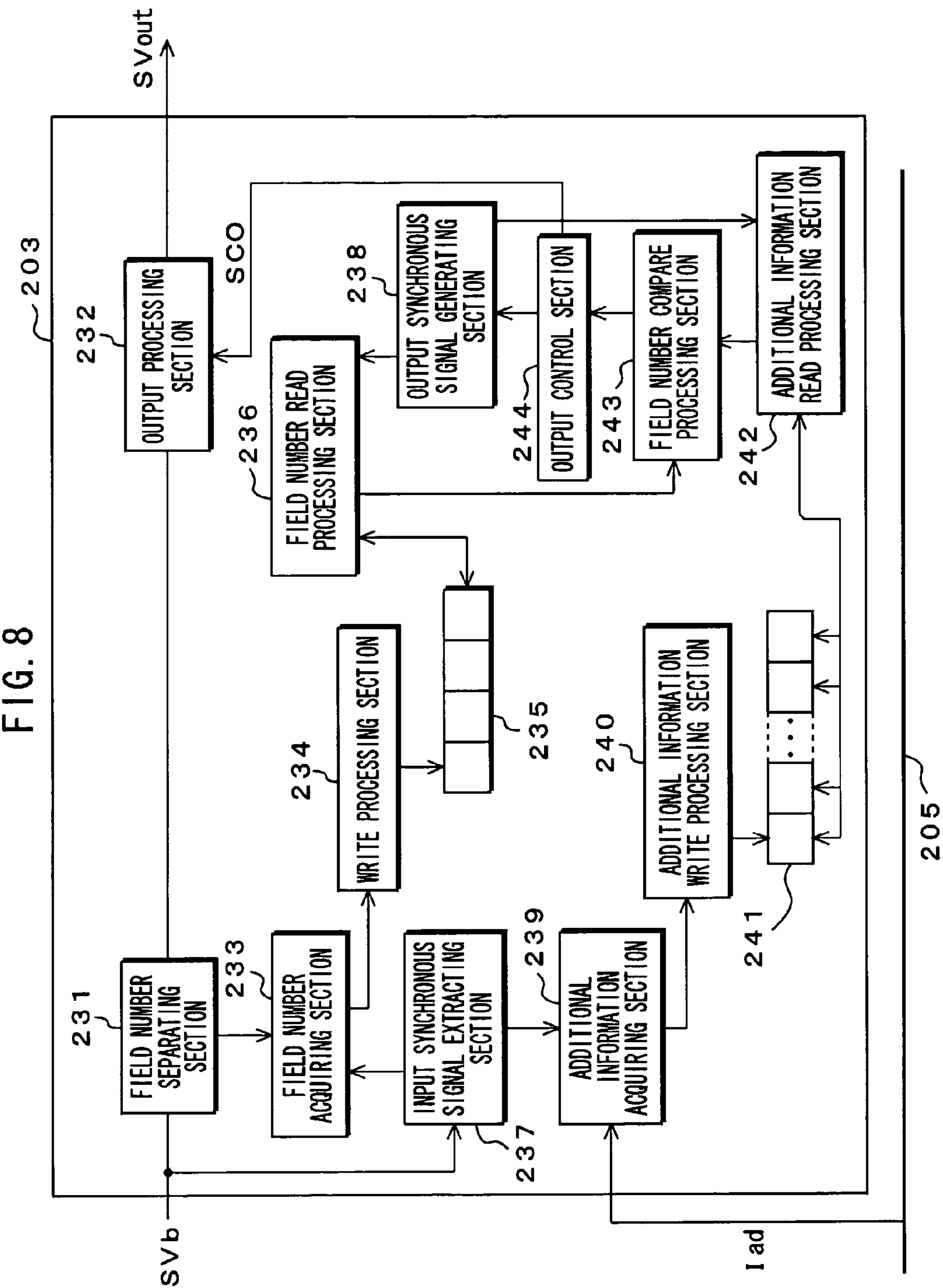
FIG. 8
SVout
SVb
SCO
Iad
203
205
231
FIELD NUMBER SEPARATING SECTION
232
OUTPUT PROCESSING SECTION
233
FIELD NUMBER ACQUIRING SECTION
234
WRITE PROCESSING SECTION
235
236
FIELD NUMBER READ PROCESSING SECTION
237
INPUT SYNCHRONOUS SIGNAL EXTRACTING SECTION
238
OUTPUT SYNCHRONOUS SIGNAL GENERATING SECTION
239
ADDITIONAL INFORMATION ACQUIRING SECTION
240
ADDITIONAL INFORMATION WRITE PROCESSING SECTION
241
242
ADDITIONAL INFORMATION READ PROCESSING SECTION
243
FIELD NUMBER COMPARE PROCESSING SECTION
244
OUTPUT CONTROL SECTION

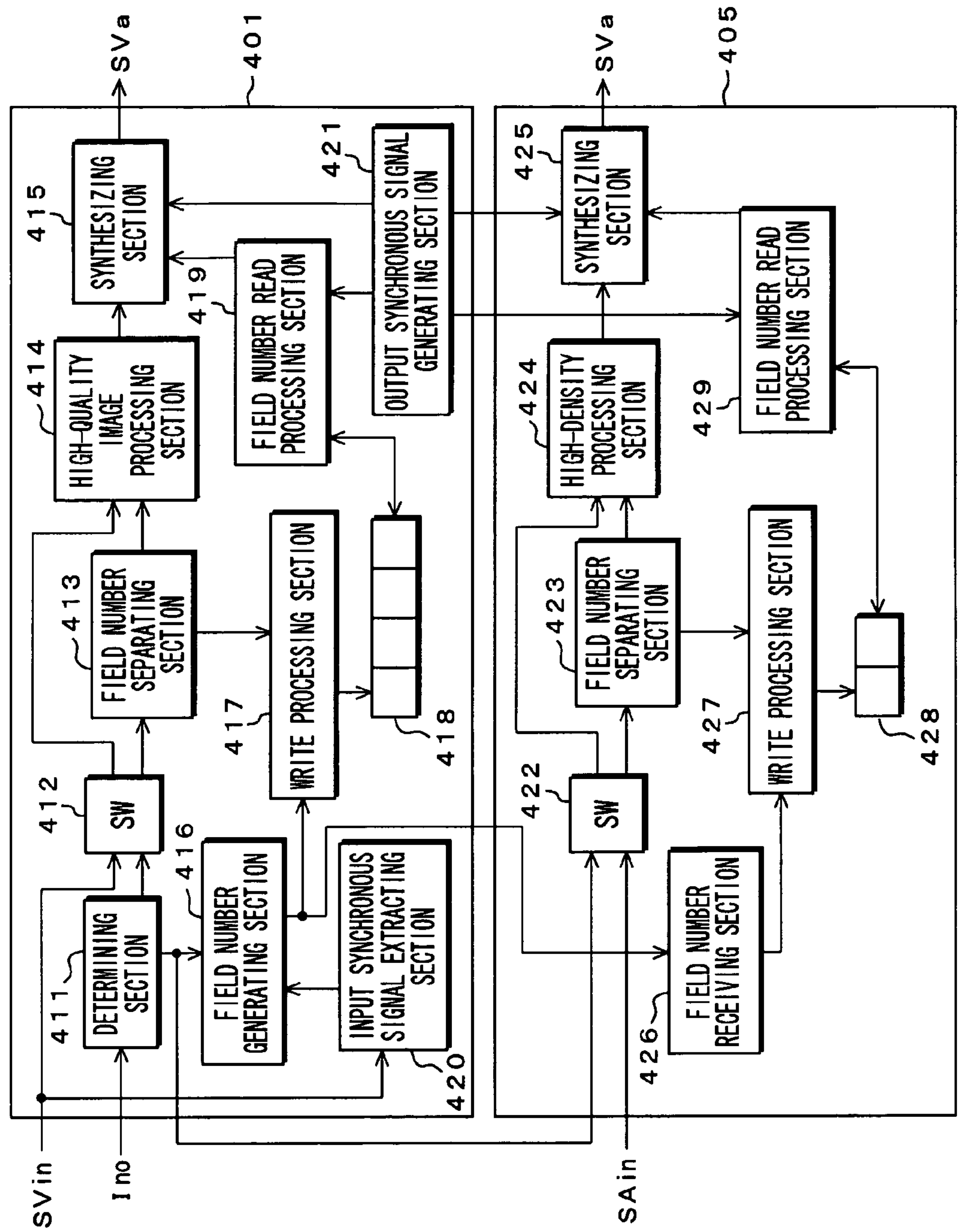
FIG. 14
SVa
401
415
SYNTHESIZING SECTION
421
OUTPUT SYNCHRONOUS SIGNAL GENERATING SECTION
419
FIELD NUMBER READ PROCESSING SECTION
414
HIGH-QUALITY IMAGE PROCESSING SECTION
413
FIELD NUMBER SEPARATING SECTION
417
WRITE PROCESSING SECTION
418
412
SW
416
FIELD NUMBER GENERATING SECTION
411
DETERMINING SECTION
420
INPUT SYNCHRONOUS SIGNAL EXTRACTING SECTION
SVin
Ino
SVa
405
425
SYNTHESIZING SECTION
424
HIGH-DENSITY PROCESSING SECTION
429
FIELD NUMBER READ PROCESSING SECTION
423
FIELD NUMBER SEPARATING SECTION
427
WRITE PROCESSING SECTION
428
422
SW
426
FIELD NUMBER RECEIVING SECTION
SAin

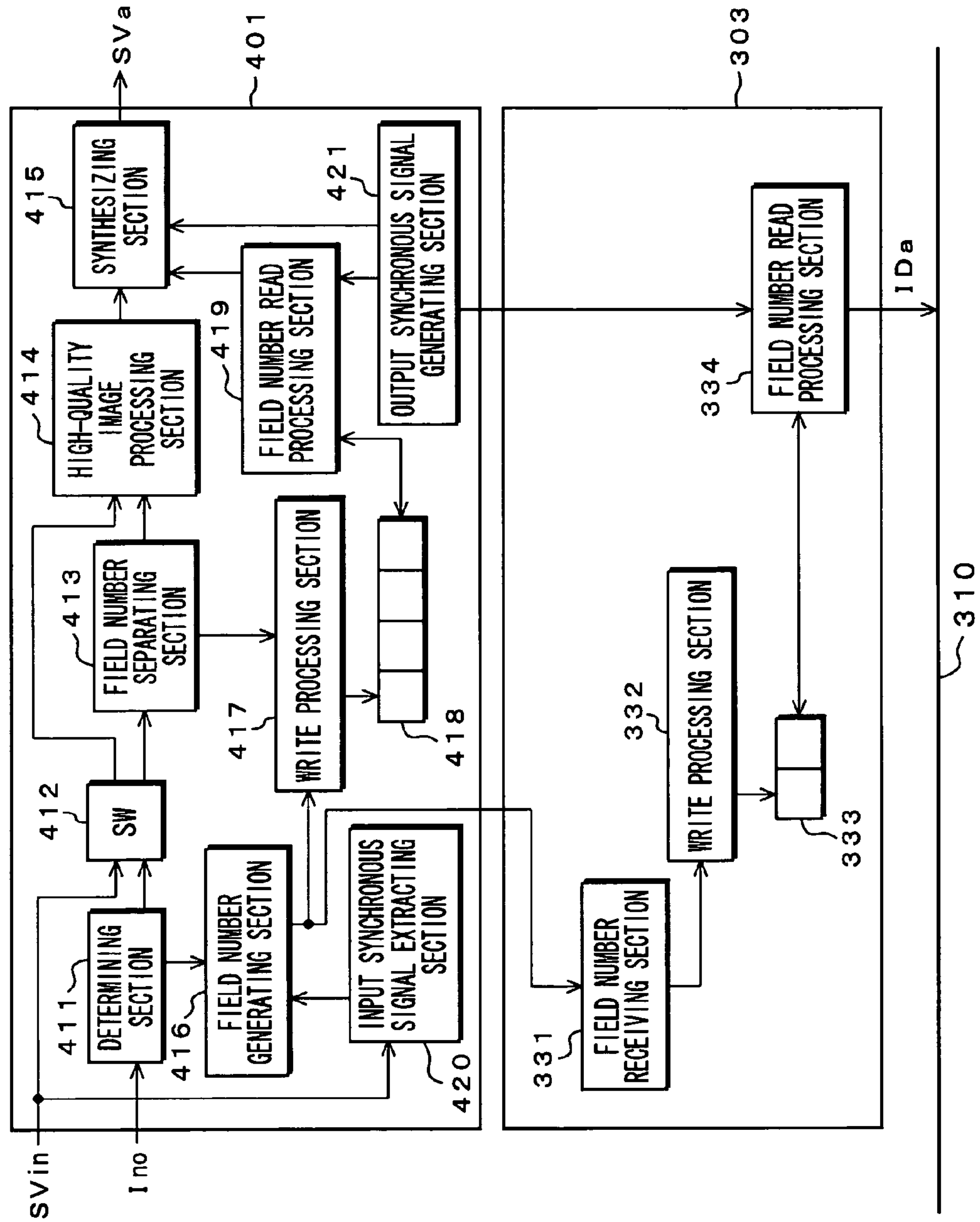
FIG. 17
SVa
401
303
415
SYNTHESIZING SECTION
421
OUTPUT SYNCHRONOUS SIGNAL GENERATING SECTION
414
HIGH-QUALITY IMAGE PROCESSING SECTION
419
FIELD NUMBER READ PROCESSING SECTION
413
FIELD NUMBER SEPARATING SECTION
417
WRITE PROCESSING SECTION
418
412
SW
411
DETERMINING SECTION
416
FIELD NUMBER GENERATING SECTION
420
INPUT SYNCHRONOUS SIGNAL EXTRACTING SECTION
SVin
Ino
334
FIELD NUMBER READ PROCESSING SECTION
IDa
332
WRITE PROCESSING SECTION
333
331
FIELD NUMBER RECEIVING SECTION
310

APPARATUS AND METHOD FOR PROCESSING INFORMATIONAL SIGNAL

CROSSREFERENCE TO RELATED APPLICATION

The present invention contains subject matter related to Japanese Patent Application JP 2005-236794 filed in the Japanese Patent Office on Aug. 17, 2005, the entire contents of which being incorporated herein by reference.

BACKGROUND OF THE INVENTION

1. Field of the Invention

The present invention relates to an apparatus and a method for processing an informational signal that are preferable for use in executing plural pieces of processing sequentially to an informational signal such as an image signal and an audio signal.

2. Description of Related Art

Meta-information for an image signal has been used relative to horizontal and vertical synchronous signals, a copy preventing signal, closed captioning, and the like. Among them, synchronous signals utilized in synchronous control operation are synchronous signals for displaying an image, and have no information for each field. Thus, the synchronous signals have information insufficient as to be utilized in a control operation for each field.

In the case where the time necessary for processing an image signal and the time necessary for processing an audio signal are processed by different methods from each other, there arises a time gap between the image created by the image signal and the audio created by the audio signal, namely, a so-called lip synchronization is failed.

For example, Japanese Patent Application Publication No. 2004-15553 discloses a technique for adjusting the lip synchronization. According to the technique disclosed in this publication, when a contents-receiver receives contents from a server at an encoder side and decodes the received contents, the contents are separated into an image packet and an audio packet that together constitute the contents, and then these packets are respectively decoded. After that, a video frame and an audio frame are output, based on the video time stamp added to the image packet and the audio time stamp added to the audio packet. In this manner, the image and the audio are output at the coincided timings with each other.

SUMMARY OF THE INVENTION

The technique disclosed in the above publication utilizes the time stamps added to the image packet and the audio packet at the encoder side. Therefore, this technique is filed to be applied to a case where no time stamps as described above are added.

Further, there are some cases where the time necessary for processing an image signal differs depending on any kinds of processing. Since no device for transmitting field information to posterior stages has existed, a way to prevent an image from being disturbed may estimate beforehand a period of processing time for which the system is necessary as a whole, and then set the estimated maximum value thereof as a blanking time.

It is desirable to provide an apparatus and a method for processing an informational signal in which first processing is executed in a first processing section and when executing second processing in a second processing section located at a posterior stage of the first processing section, the second processing section can execute excellent processing.

According to an embodiment of the present invention, there is provided an apparatus for processing an informational signal. The apparatus has a first processing section for receiving the informational signal, executing a first processing on the informational signal, and outputting the processed informational signal. The apparatus also has a second processing section, which is located at a posterior stage of the first processing section, for receiving the processed informational signal and executing a second processing on the processed informational signal. The apparatus further has transmitting device for transmitting meta-information corresponding to each predetermined period of time in the informational signal from the first processing section to the second processing section. The processing in the second processing section is controlled based on the meta-information transmitted by the transmitting device.

According to another embodiment of the present invention, there is provided a method for processing an informational signal in which first processing is executed in a first processing section, and second processing is executed in a second processing section located at a posterior stage of the first processing section. The method has the steps of transmitting meta-information corresponding to each predetermined period of time in the informational signal from the first processing section to the second processing section and controlling the processing in the second processing section based on the transmitted meta-information. Such the meta-information can be transmitted with it being added to the informational signal.

As described above, the first processing section transmits the meta-information corresponding to each predetermined period of time in the informational signal from the first processing section to the second processing section. The second processing section controls the processing based on the meta-information thus transmitted, to thereby allow to be executed excellent processing.

For example, additional information as meta-information is generated for each predetermined period of time on the informational signal output from the first processing section, and this additional information is transmitted to the second processing section through the transmitting path. In the second processing section, based on this additional information, the processing is controlled for each predetermined period of time. In this case, for example, the additional information contains information on kinds of signal indicative of whether the informational signal received by the first processing section is an image signal or a non-image signal. The second processing section then outputs the received informational signal when the information on the kind of signal is indicative of the image signal, whereas the second processing section outputs a blanking signal when the information on the kinds of signal is indicative of the non-image signal. In this manner, blanking in correspondence with the non-image signal can be assured.

Further, for example, the first processing section outputs the processed informational signal to which an identifier is added for each predetermined period of time. At the same time, an additional-information-generating section generates the meta-information as additional information including the identifier for each predetermined period of time on this processed informational signal and the meta-information as additional information is transmitted through the transmitting path. In the second processing section, the processing for the informational signal of a predetermined period of time from which a predetermined identifier has been separated is controlled based on the additional information containing the predetermined identifier among pieces of the additional information thus transmitted. When no identifier is added to the informational signal inputted into the first processing section, different identifiers are sequentially generated for each predetermined period of time, and thus-generated identifier is added for each predetermined period of time to the processed signal. As a result, a processed signal to which the identifier is added is obtained.

In this case, for example, the additional information contains, together with the identifier, information on a kind of signal indicative of whether the received informational signal is an image signal or a non-image signal. The second processing section outputs the received informational signal when the information on the kind of signal is indicative of the image signal whereas the second processing section outputs a blanking signal when the information on the kinds of signal is indicative of a non-image signal. In this manner, blanking in correspondence with the non-image signal can be assured.

Further, for example, an image-processing section executes predetermined processing on the received image signal. An image-output-processing section, which is located at a posterior stage of the image-processing section, executes output processing on the processed image signal. A first identifier as meta-information corresponding to each predetermined period of time on the image signal outputted from the image-processing section is transmitted from the image-processing section to the image-output-processing section. An audio-output-processing section receives an audio signal corresponding to the image signal and executes output processing on the audio signal. A second identifier of the audio signal received by the audio-output-processing section is generated, which identifier is identical to the first identifier generated for each predetermined period of time of the image signal in correspondence with each predetermined period of time for the image signal. This second identifier is transmitted to the audio-output-processing section.

The image-output-processing section then sequentially outputs an image signal of a predetermined period of time corresponding to the first identifier. The audio-output-processing section outputs an audio signal corresponding to each predetermined period of time for the image signal outputted from the image-output-processing section, based on the first and second identifiers. In this manner, the image signal and the audio signal are synchronized, and the lip synchronization is correctly adjusted.

Further, for example, the image-processing section outputs the processed signal to which the first identifier is added for each predetermined period of time. The image-output-processing section, which is located at a posterior stage of the image-processing signal section, executes output processing on the received image signal. The audio-processing section outputs an audio signal corresponding to the image signal received by the image-processing section, to which a second identifier identical to a first identifier added for each predetermined period of time for the image signal in correspondence with each predetermined period of time for the image signal is added. The audio-output-processing section, which is located at a posterior stage of the audio-processing section, executes output processing on the received audio signal. The image-output-processing section sequentially outputs an image signal for each predetermined period of time corresponding to the first identifier separated from the image signal. The audio-output-processing section outputs an audio signal corresponding to each predetermined period of time for the image signal outputted from the image-output-processing section, based on the first identifier separated from the image signal and the second identifier separated from the audio signal. In this manner, the image signal and the audio signal are synchronized with each other, and the lip synchronization is correctly adjusted.

Further, for example, the image-processing section outputs the processed signal to which the first identifier is added for each predetermined period of time. The image-output-processing section, which is located at a posterior stage of the image-processing signal section, executes output processing on the received image signal. The audio-output-processing section receives an audio signal corresponding to the image signal and executes output processing on the received audio signal. A second identifier of the audio signal received by the audio-output-processing section is generated, which identifier is identical to the first identifier generated for each predetermined period of time for the image signal in correspondence with each predetermined period of time for the image signal. This second identifier is transmitted to the audio-output-processing section. The image-output-processing section sequentially outputs the image signal for each predetermined period of time corresponding to the first identifier separated from the image signal. The audio-output-processing section outputs an audio signal corresponding to each predetermined period of time for the image signal output from the image-output-processing section, based on the first identifier separated from the image signal and the transmitted second identifier.

In this manner, the image signal and the audio signal are synchronized with each other, and the lip synchronization is correctly adjusted.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is a block diagram for showing a detailed configuration of an expanding DRC processing section;

FIG. 8 is a block diagram for showing a detailed configuration of an output control processing section;

FIG. 14 is a block diagram for showing detailed configurations of an expanding DRC processing section and an audio control section;

FIG. 17 is a block diagram for showing detailed configurations of an expanding DRC processing section and an audio input control section.

DESCRIPTION OF THE PREFERRED EMBODIMENTS OF THE INVENTION

Figure 1:
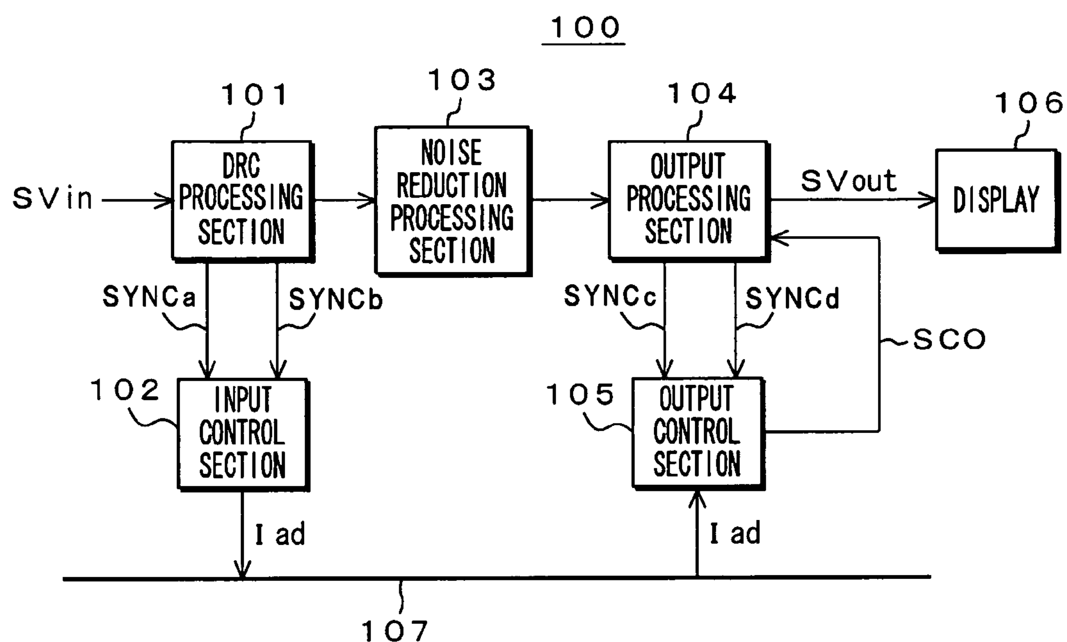
FIG. 1 is a block diagram for showing a configuration of an apparatus for processing an informational signal as a first embodiment of the invention.

A first embodiment of the present invention will be described. FIG. 1 shows a configuration of an apparatus 100 for processing an informational signal as a first embodiment of the invention.

The apparatus 100 has a digital reality creation (DRC) processing section 101, an input control section 102, a noise reduction processing section 103, an output processing section 104, an output control section 105, a display 106, and a bus 107.

The DRC processing section 101 constitutes a first processing section for receiving an image signal Svin and executing DRC processing (high-quality image processing) on the received image signal SVin. For example, the DRC processing section 101 converts a standard definition (SD) signal that is an input image signal SVin into a high definition television (HD) signal and outputs the HD signal thus obtained as an output image signal.

In this case, at the time of obtaining items of pixel data around a target position in the HD signal, for example, plural items of pixel data located around the target position in the HD signal are extracted from the SD signal, and based on these plural items of pixel data, a class to which the pixel data at the target position in the HD signal data belong is detected. Then, by use of the coefficient data of the estimation equation corresponding to this class, the pixel data at the target position in the HD signal is obtained based on this estimation equation (see Japanese Patent Application Publication No. 2001-238185). This allows a user to adjust the resolution of the HD signal freely. At this time, the coefficient data of the estimation equation corresponding to the volume value of the resolution axis operated by the user is used.

The noise reduction processing section 103 receives the image signal from the DRC processing section 101 and performs noise reduction on the image signal. The output processing section 104 constitutes a second processing section for executing output processing on the image signal output from the noise reduction processing section 103. The display 106 is constituted by a display element such as a liquid crystal display (LCD) and the like, and displays an image created by the image signal output from the output processing section 104.

The input control section 102 generates additional information Iad as meta-information for each predetermined period of time, for example, each field, for the image signal output from the DRC processing section 101, and sends this additional information Iad to the bus 107. The additional information Iad includes information on the kind of signal indicating which the signal is an image signal or a non-image signal, and a field number as an identifier. Here, the input control section 102 and the bus 107 together constitute transmitting device of the additional information Iad.

The output control section 105 acquires the additional information Iad transmitted through the bus 107, and controls the operation of the output processing section 104 based on this additional information Iad. Based on the information on a kinds of signal contained in the additional information Iad, the output processing section 104 is controlled to output the input signal when the input signal is an image signal, whereas when the input signal is a non-image signal, the output processing section is controlled to output a blanking signal instead of the input signal.

Figure 2:
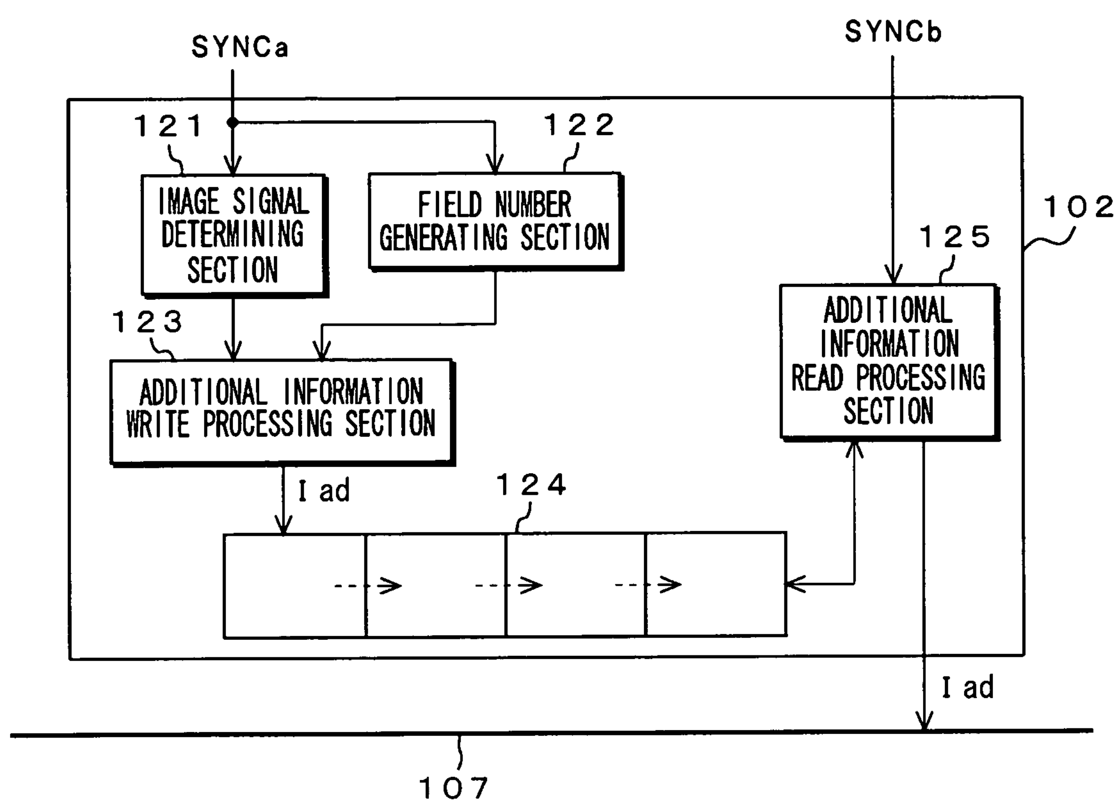
FIG. 2 is a block diagram for showing a detailed configuration of an input control section.

The following will describe a detailed configuration of the input control section 102. FIG. 2 shows the detailed configuration of the input control section 102.

The input control section 102 has an image signal determining section 121, a field number generating section 122, an additional information write processing section 123, a First-In First-Out (FIFO) section 124, and an additional information read processing section 125.

The image signal determining section 121 determines which the input signal is an image signal or a non-image signal for each field period of time, based on a synchronous signal SYNCa extracted from the input image signal SVin and supplied from the DRC processing section 101 (see FIG. 1), and outputs information on a kinds of signal as a result of the determination.

In this case, the image signal determining section 121 basically determines that the input signal is an image signal during a field period of time where there is a synchronous signal SYNCa, whereas the image signal determining section 121 determines that the input signal is a non-image signal during other field period of time. There is, however, a case where the DRC processing section 101 executes processing for outputting a non-image signal during two field periods of time after the first field of time for the input image signal SVin is input. In such a case, the image signal determining section 121 outputs information on kinds of signal after substituting the kinds of signal for the two field periods of time with the kinds of a non-image signal.

The field number generating section 122 generates field numbers sequentially incremented every field period of time based on the synchronous signal SYNCa supplied from the DRC processing section 101 (see FIG. 1).

The additional information write processing section 123 combines the information on a kinds of signal generated in the image signal determining section 121 with the field number generated in the field number generating section 122 into additional information, and writes the additional information into the FIFO section 124 for each field period. The additional information read processing section 125 reads the additional information Iad from the FIFO section 124, based on the synchronous signal SYNCb synchronous with the output image signal supplied from the DRC processing section 101 (see FIG. 1), and sends the read additional information Iad to the bus 107.

Here, a size of the FIFO section 124 depends on the processing time of the DRC processing section 101. That is, the size of the FIFO section 124 is set in such a manner that additional information Iad corresponding to each field period of time for the output image signal of the DRC processing section 101 is sent from the additional information read processing section 125 to the bus 107 in the each field period of time for the output image signal.

The following will describe operations of the input control section 102.

The image signal determining section 121 receives a synchronous signal SYNCa separated from the input image signal SVin from the DRC processing section 101. The image signal determining section 121 determines whether or not the input signal of the DRC processing section 101 is an image signal for each field period of time based on the synchronous signal SYNCa to generate information on kinds of signal. Further, the field number generating section 122 receives a synchronous signal SYNCa from the DRC processing section 101. The field number generating section 122 sequentially generates field numbers for every field period of time with them being incremented, based on the synchronous signal SYNCa.

The additional information write processing section 123 then receives the information on a kinds of signal generated in the image signal determining section 121 and the field numbers generated in the field number generating section 122. In the additional information write processing section 123, the information kinds of signal is combined with the field numbers to create additional information, and the additional information is written into the FIFO section 124.

Further, the additional information read processing section 125 receives a synchronous signal SYNCb synchronous with the output image signal from the DRC processing section 101. The additional information read processing section 125 reads additional information Iad from the FIFO section 124 based on the synchronous signal SYNCb, and sends thus-read additional information Iad to the bus 107. In this case, additional information Iad corresponding to each field period of tome for the output image signal of the DRC processing section 101 is sent to the bus 107 for each field period of time.

Figure 3:
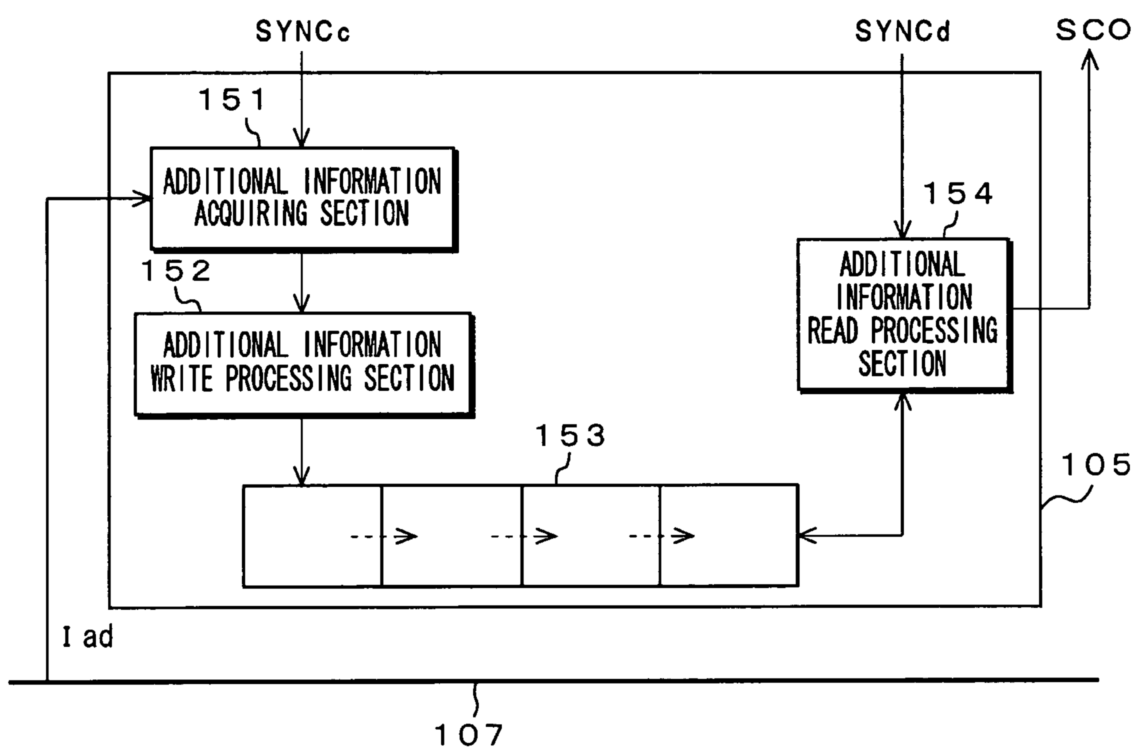
FIG. 3 is a block diagram for showing a detailed configuration of an output control section.

The following will describe a detailed configuration of the output control section 105. FIG. 3 shows a detailed configuration of the output control section 105.

The output control section 105 has an additional information acquiring section 151, an additional information write processing section 152, a FIFO section 153, and an additional information read processing section 154.

The additional information acquiring section 151 acquires the additional information Iad from the foregoing input control section 102 via the bus 107, based on the synchronous signal SYNCc extracted from the input image signal of the output processing section 104, which is supplied from the output processing section 104 (see FIG. 1). The additional information write processing section 152 writes the additional information Iad acquired in the additional information acquiring section 151 into the FIFO section 153.

The additional information read processing section 154 reads the additional information Iad from the FIFO section 153 based on the synchronous signal SYNCd synchronous with the output image signal supplied from the output processing section 104 (see FIG. 1), and generates a control signal SCO based on the information on kinds of signal contained in the additional information Iad. Then, the additional information read processing section 154 controls the output processing section 104 by the control signal SCO.

In this case, a size of the FIFO section 153 depends on the processing period of time in the noise reduction processing section 103 and the output processing section 104. That is, the size of the FIFO section 153 is set in such a manner that the additional information Iad corresponding to each field period of time for the output image signal of the output processing section 104 is read from the FIFO section 153 for each field period of time.

The output processing of the output processing section 104 is controlled by the control signal SCO in the following manner. That is, when the signal to be output from the output processing section 104 is an image signal, the output processing section 104 is controlled to output the signal. When the signal to be output from the output processing section 104 is a non-image signal, the output processing section 104 is controlled to output a blanking signal instead of the non-image signal.

The following will describe operations of the output control section 105.

The additional information acquiring section 151 receives a synchronous signal SYNCc separated from the input image signal from the output processing section 104. The additional information acquiring section 151 acquires additional information Iad from the bus 107 for each field period of time based on the synchronous signal SYNCc. The additional information write processing section 152 writes the additional information Iab into the FIFO section 153.

Further, the additional information read processing section 154 receives a synchronous signal SYNCd synchronous with the output image signal from the output processing section 104. The additional information read processing section 154 also reads additional information Iad from the FIFO section 153 based on the synchronous signal SYNCd. The additional information Iab corresponds to each field period of time for the output image signal of the output processing section 104.

The additional information read processing section 154 generates the control signal SCO for each field period of time based on the information on kinds of signal contained in the additional information Iad read from the FIFO section 153. The control signal SCO is supplied to the output processing section 104. In this case, when the signal to be output is an image signal, the output processing section 104 is controlled to output the image signal, whereas when the signal to be output is a non-image signal, the output processing section 104 is controlled to output a blanking signal instead of the non-image signal.

The following will describe operations of the apparatus 100 for processing an informational signal, which is shown in FIG. 1.

The DRC processing section 101 receives an input image signal SVin. The DRC processing section 101 performs DRC processing (high-quality image processing) on the input image signal SVin. The DRC processing section 101 transmits this output image signal to the noise reduction processing section 103 after being subjected to the high-quality image processing therein. The noise reduction processing section 103 performs any noise reduction on the output image signal from the DRC processing section 101.

The input control section 102 receives the synchronous signal SYNCa separated from the input image signal SVin in the DRC processing section 101. Further, the DRC processing section 101 supplies the synchronous signal SYNCb that is synchronous with the output image signal to the input control section 102. The input control section 102 generates the additional information Iad as the meta-information for each field of time for the image signal output from the DRC processing section 101. The resultant additional information Iad is sent to the bus 107.

The image signal after being subjected to the noise reduction in the noise reduction processing section 103 is supplied to the output processing section 104. The output processing section 104 separates the synchronous signal SYNCc from the input image signal and supplies it to the output control section 105. Further, the output processing section 104 also supplies the synchronous signal SYNCd synchronous with the output image signal to the output control section 105.

The output control section 105 acquires the additional information Iad transmitted through the bus 107, and controls the operations of the output processing section 104 based on the additional information Iad. That is, the output processing section 104 is controlled by the information on kinds of signal contained in the additional information Iad to output an input signal when the input signal is an image signal, whereas when the input signal is a non-image signal, the output processing section 104 is controlled to output a blanking signal instead of the input signal.

The display 106 then receives an image signal SVout from the output processing section 104. The display 106 displays an image created by the image signal SVout.

As described above, according to the apparatus 100 for processing an informational signal shown in FIG. 1, based on the additional information Iad sent from the DRC processing section 101 (the input control section 102) via the bus 107 to the output processing section 104 (the output control section 105), the output processing section 104 is controlled to output an image signal when the signal to be output is an image signal, whereas when the signal to be output is a non-image signal, the output processing section 104 is controlled to output a blanking signal instead of the non-image signal. As a result, blanking in correspondence with a non-image signal can be assured.

Figure 4:
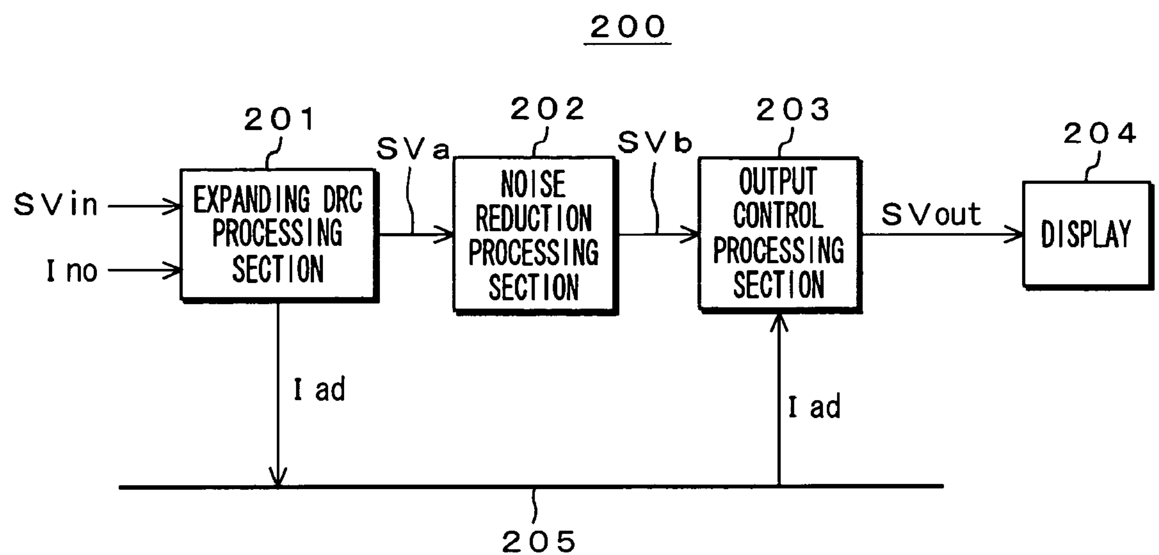
FIG. 4 is a block diagram for showing a configuration of an apparatus for processing an informational signal as a second embodiment of the invention.

Next, a second embodiment of the present invention will be described. FIG. 4 shows a structure of an apparatus 200 for processing an informational signal as a second embodiment of the invention.

The apparatus 200 for processing the informational signal has an expanding DRC processing section 201, a noise reduction processing section 202, an output control processing section 203, a display 204, and a bus 205.

The expanding DRC processing section 201 constitutes a first processing section. The expanding DRC processing section 201 executes a high-quality image processing (a DRC processing) on an input image signal SVin and outputs an identifier as meta-information for each field period of time, in this embodiment, processed image signal to which a field number is added. In this embodiment, a signal path of the image signal constitutes transmitting device of a field number. In the high-quality image processing, for example, a SD signal as an input image signal SVin is converted into an HD signal. This high-quality image processing is the same as the high-quality image processing executed by the DRC processing section 101 of the apparatus 100 for processing the informational signal shown in FIG. 1.

Further, the expanding DRC processing section 201 generates additional information Iad as meta-information for each field of time for an image signal output from the expanding DRC processing section 201, and sends this additional information Iad to the bus 205. This additional information is constituted by information on a kinds of signal that is indicative of which the signal is an image signal or a non-image signal, and a field number as an identifier. Here, the expanding DRC processing section 201 and the bus 205 together constitute transmitting device of the additional information Iad.

The noise reduction processing section 202 reduces noises from the output image signal of the expanding DRC processing section 201.

The output control processing section 203 constitutes a second processing section, and executes an output processing on the image signal output from the noise reduction processing section 202. Further, the output control processing section 203 separates a field number added to the input image signal for each field period of time from the input image signal, and at the same time, acquires the additional information Iad transmitted via the bus 205, and then, executes an output processing operation based on thus-obtained field number and the additional information Iad. In this case, when the input signal is an image signal, the output control processing section 203 outputs the input signal whereas when the input signal is a non-image signal, the output control processing section 203 outputs a blanking signal instead of the input signal.

The display 204 is constituted by a display element such as a liquid crystal display (LCD) and the like, and displays an image created by the image signal SVout output from the output control processing section 203.

The following will describe a detailed configuration of the expanding DRC processing section 201. FIG. 5 shows a detailed configuration of the expanding DRC processing section 201.

The expanding DRC processing section 201 has a determining section 211, a switch (SW) 212, a field number separating section 213, a high-quality image processing section 214, a synthesizing section 215, a field number generating section 216, a write processing section 217, a FIFO section 218, a field number read processing section 219, an input synchronous signal extracting section 220, and an output synchronous signal generating section 221.

Figure 6:
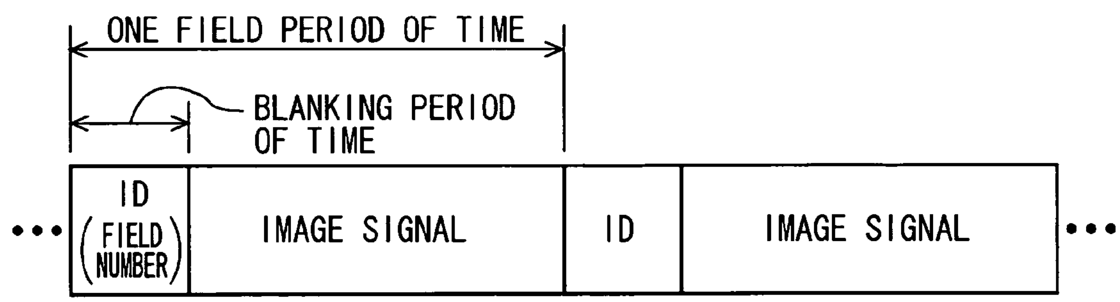
FIG. 6 is a diagram for showing an added state of a field number in an image signal.

The determining section 211 determines, based on additional information Ino for number, whether or not a field number has already been added to an input image signal SVin. The additional information Ino for number is information indicative of whether or not a field number has already been added to the input image signal SVin for each field period of time. FIG. 6 shows a state where a field number (ID) has already been added to an image signal, and the field number is inserted into a blanking period of time.

The switch 212 switches between a supply of the input image signal SVin to the high-quality image processing section 214 and that to the field number separating section 213, based on the result of the determination made by the determining section 211. That is, the switch 212 supplies the input image signal SVin to the field number separating section 213 when the input image signal SVin has a field number added thereto, whereas the switch 212 supplies the input image signal SVin to the high-quality image processing section 214 when the input image signal SVin has no field number added thereto.

The field number separating section 213 separates a field number for each field period of time from the input image signal SVin to which the field number is added, and at the same time, supplies the image signal from which the field number has been separated to the high-quality image processing section 214. The high-quality image processing section 214 executes DRC processing (high-quality image processing) on the input image signal.

The input synchronous signal extracting section 220 extracts a synchronous signal from the input image signal SVin. The field number generating section 216 generates, based on the result of the determination made by the determining section 211, field numbers sequentially incremented every field period of time in synchronization with the synchronous signal extracted in the input synchronous signal extracting section 220. In this case, the field number generating section 216 generates a field number when the input image signal SVin has no field number added thereto.

The write processing section 217 writes a field number separated in the field number separating section 213, or a field number generated in the field number generating section 216 into the FIFO section 218 for each field period of time. The field number read processing section 219 reads the field number from the FIFO section 218 based on the synchronous signal generated in the output synchronous signal generating section 221, and supplies the read field number to the synthesizing section 215. The synthesizing section 215 inserts the field number into a blanking period of time for the image signal after being subjected to a high-quality image processing in the high-quality image processing section 214, and outputs the processed image signal SVa to which a field number is added in synchronization with the synchronous signal generated in the output synchronous signal generating section 221.

Here, a size of the FIFO section 218 depends on the processing period of time in the high-quality image processing section 214. That is, the size of the FIFO section 128 is set in such a manner that a field number corresponding to each field period of time for the output image signal of the high-quality image processing section 214 is supplied from the field number read processing section 219 to the synthesizing section 215 for each field period of time.

Further, the expanding DRC processing section 201 further has an image signal determining section 222, a field number receiving section 223, an additional information write processing section 224, a FIFO section 225, an additional information read processing section 226.

The image signal determining section 222 determines which the input signal is an image signal or a non-image signal for each field period of time based on the synchronous signal extracted in the input synchronous signal extracting section 220, and outputs information on kinds of signal as a result of the determination.

In this case, the image signal determining section 222 basically determines that the input signal is an image signal during a field period of time when there is a synchronous signal, whereas determines that the input signal is a non-image signal during other field period of time. There is, however, a case where the high-quality image processing section 214 outputs a non-image signal for two field periods of time after the first field of the input image signal SVin is input. In such a case, the image signal determining section 222 outputs the information on the kinds of signal after substituting the kind of signal during the two field periods of time with the kind of a non-image signal.

The field number receiving section 223 receives a field number separated in field number separating section 213 and written into the FIFO section 218 by the write processing section 217, or a field number generated in the field number generating section 216.

Figure 7:
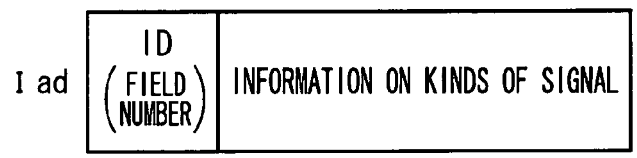
FIG. 7 is a diagram for showing a configuration of additional information.

The additional information write processing section 224 combines the information on a kinds of signal generated in the image signal determining section 222 with the field number received in the field number receiving section 223 into additional information, and writes the additional information into the FIFO section 225 for each field period of time. FIG. 7 shows additional information Iad associated with the field number (ID) and the information on the kinds of signal. The additional information read processing section 226 reads the additional information Iad from the FIFO section 225 based on the synchronous signal generated in the output synchronous signal generating section 221, and sends the read additional information to the bus 205.

The following will describe operations of the expanding DRC processing section 201.

The input image signal SVin is supplied to the switch 212 and to the input synchronous signal extracting section 220. When the input image signal SVin has no field number added thereto, the input image signal SVin is supplied to the high-quality image processing section 214 via the switch 212. In addition, field numbers, which are sequentially incremented every field period of time, are generated in the field number generating section 216 in synchronization with the synchronous signal extracted in the input synchronous signal extracting section 220.

On the other hand, when the input image signal SVin has a field number added thereto, the input image signal SVin is supplied to the field number separating section 213 via the switch 212. The field number separating section 213 separates a field number from the input image signal SVin, and supplies the image signal from which the field number is separated to the high-quality image processing section 214. The high-quality image processing section 214 performs the DRC processing (high-quality image processing) on the input image signal, and supplies the processed image signal to the synthesizing section 215.

Further, the field number separated in the field number separating section 213 or the field number generated in the field number generating section 216 is written into the FIFO section 218 through the write processing section 217. The output synchronous signal generating section 221 supplies a synchronous signal to the field number read processing section 219. The field number read processing section 219 reads a field number from the FIFO section 218 based on the synchronous signal, and supplies it to the synthesizing section 215. In this case, for each field period of time for the output image signal of the high-quality image processing section 214, the field number corresponding to each field period of time is supplied from the field number read processing section 219 to the synthesizing section 215.

The synthesizing section 215 inserts the field number into the blanking period of time for the image signal after being subjected to the high-quality image processing in the high-quality image processing section 214. Then, a processed image signal SVa to which a field number is added is output in synchronization with the synchronous signal generated in the output synchronous signal generating section 221.

The input synchronous signal extracting section 220 extracts a synchronous signal from the input image signal SVin and supplies the extracted synchronous image to the image signal determining section 222. The image signal determining section 222 determines which the input signal of the expanding DRC processing section 201 is an image signal or a non-image signal, based on the synchronous signal, for each field period of time, and generates information on kinds of signal. Further, the field number receiving section 223 receives the field number separated in the field number separating section 213 or the field number generated in the field number generating section 216, which are to be written into the FIFO section 218 through the write processing section 217.

The information on the kinds of signal that is generated in the image signal determining section 222 and the field number received in the field number receiving section 223 are supplied to the additional information write processing section 224. The additional information write processing section 224 combines the information on the kinds of signal with the field number into additional information, and writes this additional information into the FIFO section 225.

Further, the additional information read processing section 226 receives the synchronous signal generated in the output synchronous signal generating section 221. The additional information read processing section 226 reads the additional information Iad from the FIFO section 225 based on the synchronous signal, and sends the read additional information Iad to the bus 205. In this case, the additional information Iad corresponding to each field of time for the output image signal of the expanding DRC processing section 201 is sent to the bus 205.

The following will describe a detailed configuration of the output control processing section 203. FIG. 8 shows the detailed configuration of the output control processing section 203.

The output control processing section 203 has a field number separating section 231, an output processing section 232, a field number acquiring section 233, a write processing section 234, a FIFO section 235, a field number read processing section 236, an input synchronous signal extracting section 237, an output synchronous signal generating section 238, an additional information acquiring section 239, an additional information write processing section 240, a FIFO section 241, an additional information read processing section 242, a field number compare processing section 243, and an output control section 244.

The field number separating section 231 separates a field number (ID) for each field period of time from an input image signal SVb to which a field number is added, and at the same time, supplies the image signal from which the field number is separated to the output processing section 232.

The input synchronous signal extracting section 237 extracts a synchronous signal from the input image signal SVb. The field number acquiring section 233 acquires the field number separated in the field number separating section 231 at the timing of the synchronous signal extracted in the input synchronous signal extracting section 237.

The write processing section 234 writes the field number acquired in the field number acquiring section 233 into the FIFO section 235 for each field period of time. The field number read processing section 236 reads a field number from the FIFO section 235 based on the synchronous signal generated in the output synchronous signal generating section 238. Here, a size of the FIFO section 235 depends on the processing period of time in the output processing section 232. That is, the size of the FIFO section 235 is set in such a manner that a field number corresponding to each field period of time for the output image signal of the output processing section 232 is read from the FIFO section 235 for each field period of time.

The additional information acquiring section 239 acquires the additional information Iad sent from the foregoing expanding DRC processing section 201 through the bus 205, based on the synchronous signal extracted in the input synchronous signal extracting section 237. The additional information write processing section 240 receives the additional information Iad from the additional information acquiring section 239 and writes it into the FIFO section 241.

The additional information read processing section 242 reads additional information Iad of plural field periods of time from the respective stages of the FIFO section 241, based on the synchronous signal generated in the output synchronous signal generating section 238. Here, the number of the stages in the FIFO section 241 is set in such a manner that the additional information Iad containing the field number read from the foregoing FIFO section 235 by the field number read processing section 236 exists in the additional information Iad for plural field periods of time which are read from the respective stages of the FIFO section 241.

The field number compare processing section 243 compares the field number contained in each additional information Iad read by the additional information read processing section 242 for plural field periods of time with the field number read in the field number read processing section 236, acquires information on a kinds of signal constituting the additional information Iad having a matched field number, and then, sends the information on the kinds of signal to the output control section 244.

The output control section 244 generates a control signal SCO for controlling the output processing in the output processing section 232 in synchronization with the synchronous signal generated in the output synchronous signal generating section 238, based on the information on the kinds of signal sent from the field number compare processing section 243. In this case, the control signal SCO executes control in such a manner that when the signal to be output from the output processing section 232 is an image signal, the image signal is output whereas when the signal to be output from the output processing section 232 is a non-image signal, a blanking signal is output instead of the non-image signal.

The following will describe operations of the output control processing section 203.

The field number separating section 231 receives the input image signal SVb, and at the same time, the input synchronous signal extracting section 237 also receives it. The field number separating section 231 separates a field number from the input image signal SVb and supplies the image signal from which the field number is separated to the output processing section 232.

The field number separated in the field number separating section 231 is supplied to the field number acquiring section 233. The field number acquiring section 233 acquires a field number based on the synchronous signal extracted in the input synchronous signal extracting section 237. The field number acquired in the field number acquiring section 233 is written into the FIFO section 235 through the write processing section 234. Then, the field number read processing section 236 reads a field number for each field period of time based on the synchronous signal generated in the output synchronous signal generating section 238.

The additional information acquiring section 239 acquires additional information Iad, based on the synchronous signal extracted in the input synchronous signal extracting section 237, from the bus 205 for each field period of time. The additional information write processing section 240 writes this additional information Iab into the FIFO section 241. Then, the additional information read processing section 242 reads additional information Iad for plural field periods of time from the respective stages of the FIFO section 241 for each field period of time, based on the synchronous signal generated in the output synchronous signal generating section 238.

The field number read in the field number read processing section 236 and the additional information Iad for plural field periods of time read in the additional information read processing section 242 are respectively supplied to the field number compare processing section 243. The field number compare processing section 243 compares the field number contained in each additional information Iad for plural field periods of time with the field number read in the field number read processing section 236, and acquires information on a kinds of signal constituting the additional information Iad having a matched field number. The information on the kinds of signal is sent to the output control section 244.

The output control section 244 generates the control signal SCO in synchronization with the synchronous signal generated in the output synchronous signal generating section 238, based on the information on the kinds of signal that is sent from the field number compare processing section 243. The control signal SCO is sent to the output processing section 232. In this case, the output processing section 232 is controlled in such a manner that when the signal to be output is an image signal, the image signal is output whereas when the signal to be output is a non-image signal, a blanking signal is output instead of the non-image signal.

The following will describe operations of the apparatus 200 for processing an informational signal as shown in FIG. 4.

The input image signal SVin is supplied to the expanding DRC processing section 201. The expanding DRC processing section 201 performs the DRC processing (high-quality image processing) on the input image signal SVin. The expanding DRC processing section 201 then outputs a processed image signal SVa to which a field number is added for each field period of time. The noise reduction processing section 202 then performs any noise reduction processing on the processed image signal SVa and supplies the noise reduced image signal SVb to the output control processing section 203.

Further, the expanding DRC processing section 201 generates additional information Iad constituted by a field number (ID) and information a kinds of signal for each field of time for image signal output from the expanding DRC processing section 201. This additional information Iad is sent to the bus 205.

The output control processing section 203 executes any output processing on the image signal SVb output from the noise reduction processing section 202. In this case, the field number added to the image signal SVb for each field period of time is separated, and at the same time, the additional information Iad transmitted through the bus 205 is acquired. The output processing is controlled based on the field number and the additional information Iad.

In this case, the output for each field period of time is controlled based on the information on a kinds of signal of the additional information Iad containing the same field number as the current field period of time. When the input signal is an image signal, the input signal is output, whereas when the input signal is a non-image signal, a blanking signal is output instead of the input signal.

The image signal SVout output from the output control processing section 203 is supplied to the display 204. The display 204 then displays an image created by the image signal SVout.

Thus, according to the apparatus 200 for processing an informational signal as shown in FIG. 4, based on the field number (ID) sent from the expanding DRC processing section 201 to the output control processing section 203 in a state of being inserted into the blanking period of the image signal, and the additional information Iad sent via the bus 205, the output control processing section 203 is controlled to output an image signal when the signal to be output is the image signal, whereas when the signal to be output is a non-image signal, the output control processing section 203 is controlled to output a blanking signal instead of the non-image signal. As a result, blanking in correspondence with a non-image signal can be assured.

Figure 9:
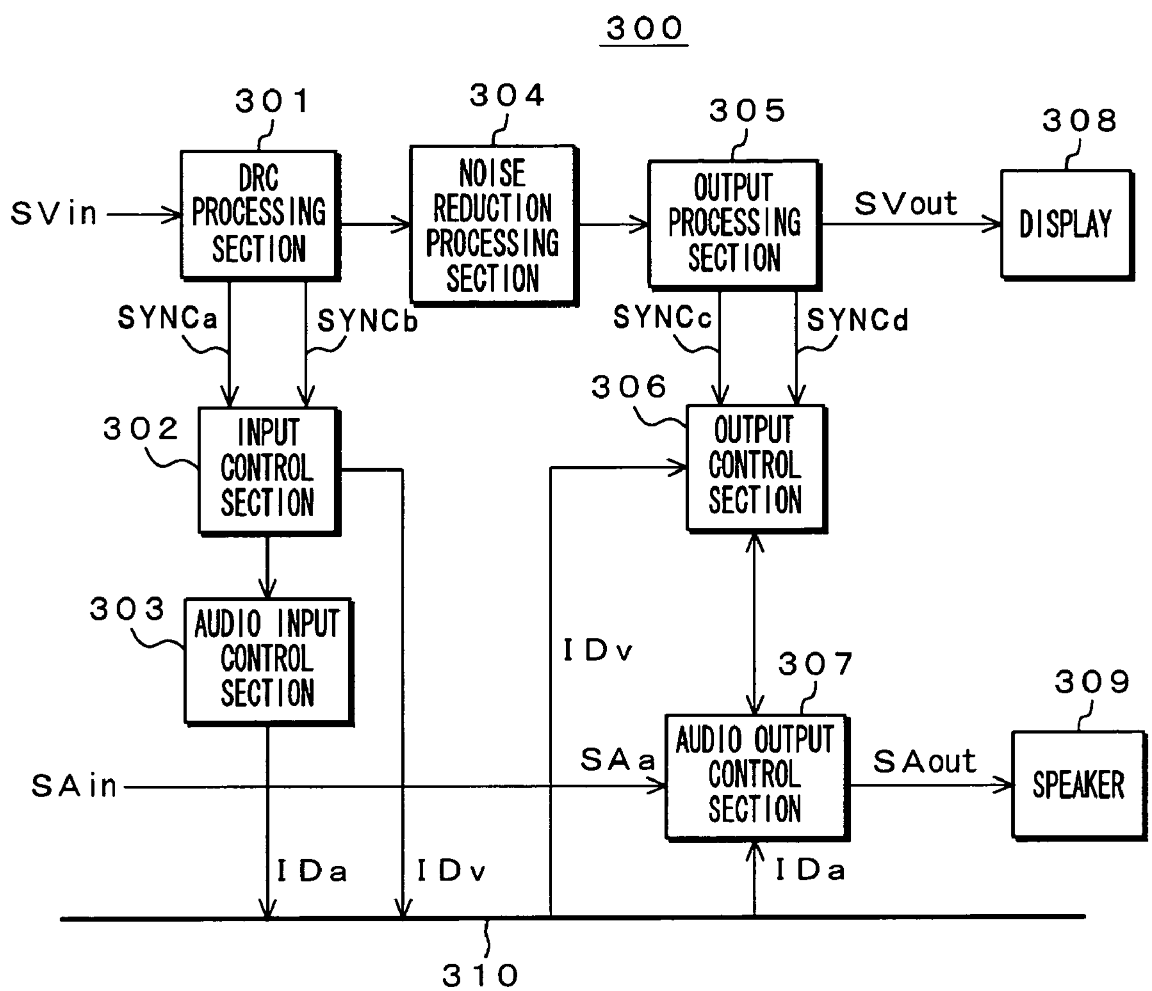
FIG. 9 is a block diagram for showing a configuration of an apparatus for processing an informational signal as a third embodiment of the invention.

Next, a third embodiment of the present invention will be described. FIG. 9 shows a configuration of an apparatus 300 for processing an informational signal as a third embodiment of the invention.

The apparatus 300 for processing the informational signal has a DRC processing section 301, an input control section 302, an audio input control section 303, a noise reduction processing section 304, an output processing section 305, an output control section 306, an audio output control section 307, a display 308, a speaker 309, and a bus 310.

The DRC processing section 301 constitutes an image processing section and executes DRC processing (high-quality image processing) on the input image signal SVin. The DRC processing is the same as the DRC processing conducted in the DRC processing section 101 of the apparatus 100 for processing an informational signal as shown in FIG. 1. The noise reduction processing section 304 executes any noise reduction on the output image signal of the DRC processing section 301. The output processing section 305 executes any output processing on the image signal output from the noise reduction processing section 304. The display 308 is constituted by a display element such as a liquid crystal display (LCD), and displays an image based on an image signal SVout output from the output processing section 305. The speaker 309 outputs sounds based on an audio signal SAout output from the audio output control section 307.

The input control section 302 generates an identifier as meta-information, in this embodiment, a field number IDv, for each field period of time for the image signal output from the DRC processing section 301, and sends the field number IDv to a first line constituting the bus 310. The audio input control section 303 generates an identifier as meta-information, in this embodiment, a field number Ida, for each field period of time for the input audio signal SAin, and sends this field number IDa to a second line constituting the bus 310. In this case, in correspondence with each field period of time for the input image signal SVin, the field number IDa of the input audio signal SAin is generated, which is identical to the field number IDv generated for each field period of time for the input image signal SVin.

The output control section 306 acquires the field number IDv sent through the first line of the bus 310. The output processing section 305 sequentially outputs the image signals of the field periods of time each of which corresponds to the field number IDv. The audio output control section 307 acquires the field number IDa sent through the second line of the bus 310, and based on this field number IDa and the foregoing field number IDv, outputs an audio signal SAout corresponding to each field period of time for the image signal SVout output from the output processing section 305.

Figure 10:
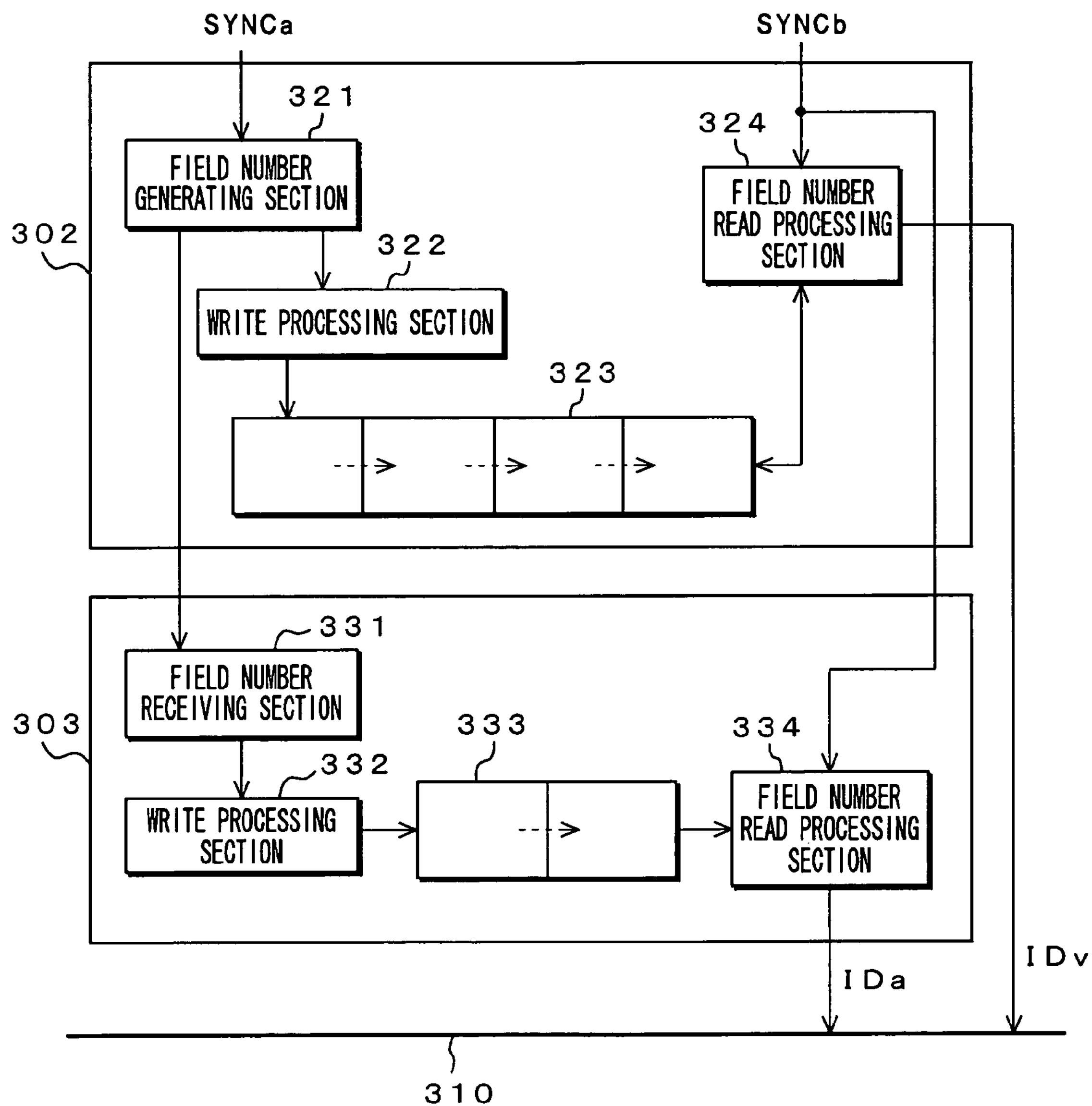
FIG. 10 is a block diagram for showing configurations of an input control section and an audio input control section.

The following will describe detailed configuration of the input control section 302 and the audio input control section 303. FIG. 10 shows detailed configurations of the input control section 302 and the audio input control section 303.

The input control section 302 has a field number generating section 321, a write processing section 322, a FIFO section 323, and a field number read processing section 324.

The field number generating section 321 generates field numbers based on the synchronous signal SYNCa extracted from the input image signal SVin and supplied from the DRC processing section 301 (see FIG. 9) with the field numbers being sequentially incremented every field period of time. The write processing section 322 writes the field number generated in the field number generating section 321 into the FIFO section 323 for each field period of time. The field number read processing section 324 reads the field number IDv from the FIFO section 323 based on the synchronous signal SYNCb supplied from the DRC processing section 301, and sends the read field number IDv to the first line of the bus 310.

Here, a size of the FIFO section 323 depends on the processing period of time in the DRC processing section 301. That is, the size of the FIFO section 323 is set in such a manner that a field number IDv corresponding to each field period of time for the output image signal from the DRC processing section 301 is sent from the field number read processing section 324 to the bus 310 for each field period of time.

Further, the audio input control section 303 has a field number receiving section 331, a write processing section 332, a FIFO section 333, and a field number read processing section 334.

The field number receiving section 331 receives the field number generated in the field number generating section 321 of the foregoing input control section 302. The write processing section 332 writes the field number that is received in the field number receiving section 331 into the FIFO section 333 for each field period of time. The field number read processing section 334 reads the field number IDa from the FIFO section 333 based on the synchronous signal SYNCb supplied from the DRC processing section 301, and sends the read field number IDa to the second line of the bus 310.

Here, a size of the FIFO section 333 is smaller than that of the FIFO section 323 of the input control section 302 because the foregoing DRC processing section 301 performs no processing especially on an audio signal. In this case, the size of the FIFO section 333 is set in such a manner that the field number IDa corresponding to each field period of time for the audio signal that is input into the audio output control section 307 is sent from the field number read processing section 334 to the second line of the bus 310 for each field of time.

The following will describe operations of the input control section 302 and the audio input control section 303.

The field number generating section 321 receives the synchronous signal SYNCa, which is extracted from the input image signal SVin, from the DRC processing section 301, and generates field numbers based on the synchronous signal SYNCa with the field numbers being sequentially incremented for each field period of time. This field numbers are written into the FIFO section 323 through the write processing section 322. Then, the field number read processing section 324 receives the synchronous signal SYNCb that is synchronous with the output image signal from the DRC processing section 301 and reads the field number IDv as a first identifier from the FIFO section 323 based on the synchronous signal SYNCb. The read field number IDv is sent to the first line of the bus 310. In this case, for each field period of time for the output image signal of the DRC processing section 301, the field number IDv corresponding to the field period of time is sent to the first line of the bus 310.

Further, the field number receiving section 331 receives the field number generated in the field number generating section 321 of the input control section 302. The field number is written into the FIFO section 333 through the write processing section 332. Then, the field number read processing section 334 receives the synchronous signal SYNCb from the DRC processing section 301 and reads the field number IDa as a second identifier from the FIFO section 333 based on the synchronous signal SYNCb. The read field number IDa is sent to the second line of the bus 310. In this case, for each field of time for the input audio signal of the audio output control section 307, the field number IDa corresponding to the field period of time is sent to the second line of the bus 310.

Figure 11:
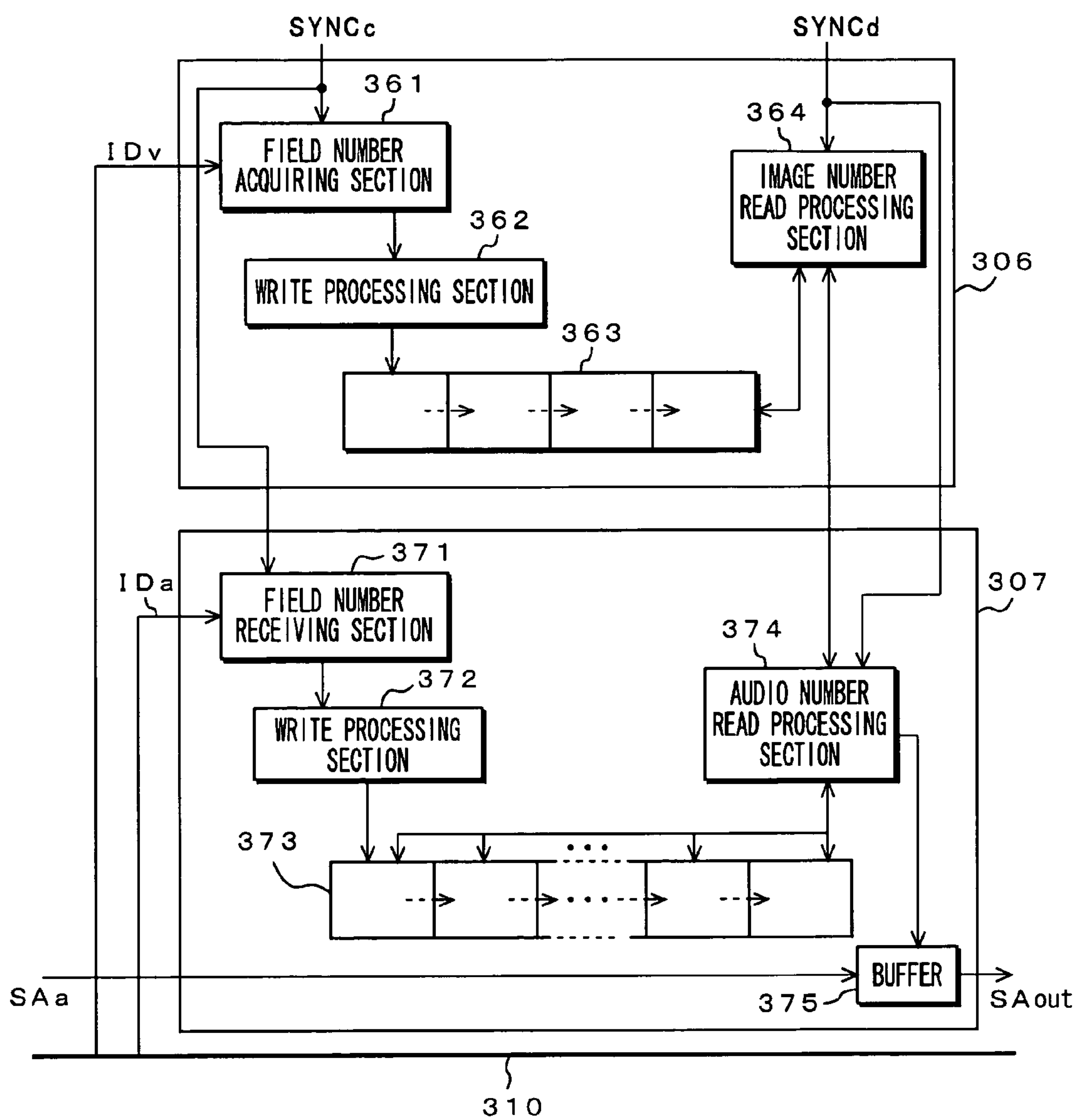
FIG. 11 is a block diagram for showing configurations of an output control section and an audio output control section.

The following will describe detailed configuration of the output control section 306 and the audio output control section 307. FIG. 11 shows detailed configurations of the output control section 306 and the audio output control section 307, respectively.

The output control section 306 has a field number acquiring section 361, a write processing section 362, a FIFO section 363, and an image number read processing section 364.

The field number acquiring section 361 acquires a field number IDv sent from the foregoing input control section 302 through the first line of the bus 310, based on the synchronous signal SYNCc extracted from the input image signal of the output processing section 305 and supplied from the output control section 305 (see FIG. 9). The write processing section 362 writes the field number IDv acquired in the field number acquiring section 361 into the FIFO section 363.

The image number read processing section 364 reads the field number IDv from the FIFO section 363 based on the synchronous signal SYNCd that is synchronous with the output image signal and supplied from the output processing section 305 (see FIG. 9). In this case, a size of the FIFO section 363 depends on the processing period of time in the noise reduction processing section 304 and the output processing section 305. That is, the size of the FIFO section 363 is set in such a manner that the field number IDv corresponding to each field period of time for the output image signal of the output processing section 305 is read from the FIFO section 363 for each field period of time.

The audio output control section 307 has a field number acquiring section 371, a write processing section 372, a FIFO section 373, an audio number processing section 374, and a buffer 375.

The field number acquiring section 371 acquires the field number IDa that is sent from the foregoing audio input control section 303 through the second line of the bus 310, based on the synchronous signal SYNCc that is extracted from the input image signal of the output processing section 305 and supplied from the output processing section 305 (see FIG. 9). The write processing section 372 writes the field number IDa acquired in the field number acquiring section 371 into the FIFO section 373.

The audio number processing section 374 reads the field numbers IDa of plural field periods of time from the respective stages of the FIFO section 373, based on the synchronous signal SYNCd that is synchronous with the output image signal and supplied from the output processing section 305 (see FIG. 9). Here, the number of the stages of the FIFO section 373 is set in such a manner that the field number read from the foregoing FIFO section 363 by the image number read processing section 364 exists in the field numbers IDa of the plural field periods of time read from the respective stages of the FIFO section 373.

Further, the audio number processing section 374 confirms that a field number coinciding with the field number read from the FIFO section 363 by the image number read processing section 364 exists in the field numbers IDa of plural field periods of time, and controls a buffer 375 to output the audio signal of the field period of time corresponding to the field number. For reference, the buffer 375 is configured to hold the audio signal of each field period of time corresponding to the field number IDa held in each stage of the FIFO section 373.

The following will describe operations of the output control section 306 and the audio output control section 307.

The field number acquiring section 361 receives the synchronous signal SYNCc, which is extracted from an input image signal, from the output processing section 305. The field number acquiring section 361 acquires the field number IDv from the first line of the bus 310 for each field period of time based on the synchronous signal SYNCc. The field number IDv is written into the FIFO section 363 through the write processing section 362.

The image number read processing section 364 receives the synchronous signal SYNCd, which is synchronous with the output image signal, from the output processing section 305. The image number read processing section 364 reads the field number IDv from the FIFO section 363 based on the synchronous signal SYNCd. The field number IDv corresponds to each field period of time for the output image signal SVout of the output processing section 305.

The field number acquiring section 371 receives the synchronous signal SYNCc, which is extracted from the input image signal, from the output processing section 305. The field number acquiring section 371 acquires the field number IDa from the second line of the bus 310 for each field period of time, based on the synchronous signal SYNCc. This field number IDa is written into the FIFO section 373 through the write processing section 372.

The audio number processing section 374 receives the synchronous signal SYNCd from the output processing section 305 and reads the field numbers IDa of plural field periods of time from the respective stages of the FIFO section 373 based on the synchronous signal SYNCd. Then, the audio number processing section 374 confirms that a field number coinciding with the field number read from the FIFO section 363 by the image number read processing section 364 exists in the field numbers IDa of plural field periods of time, and the buffer 375 is controlled to output the audio signal of the field period of time corresponding to the field number.

The following will describe operations of the apparatus 300 for processing an informational signal as shown in FIG. 9.

The DRC processing section 301 receives the input image signal SVin. This DRC processing section 301 executes DRC processing (high-quality image processing) on the input image signal SVin. The noise reduction processing section 304 then receives the output image signal after being subjected to the high-quality image processing in the DRC processing section 301. The noise reduction processing section 304 executes any noise reduction on the output image signal of the DRC processing section 301.

The input control section 302 receives the synchronous signal SYNCa separated from the input image signal SVin from the DRC processing section 301. Further, the input control section 302 receives the synchronous signal SYNCb that is synchronous with the output image signal from the DRC processing section 301. The input control section 302 generates a field number IDv as meta-information for each field of time for the image signal output from the DRC processing section 301. This field number IDv is sent to the first line of the bus 310.

The audio input control section 303 receives the synchronous signals SYNCa and SYNCb from the DRC processing section 301. The audio input control section 303 generates the field number IDa corresponding to each field period of time of the audio signal input into the audio output control section 307, for each field period of time, and sends this field number IDa to the second line of the bus 310.

The output processing section 305 receives the image signal after being subjected to the noise reduction from the noise reduction processing section 304, and outputs an output image signal SVout. The output control section 306 receives the synchronous signals SYNCc extracted from the input image signal and the synchronous signal SYNCd that is synchronous with the output image signal, from the output processing section 305.

The output control section 306 acquires the field number IDv transmitted through the first line of the bus 310 for each field period of time. The field number IDv acquired for each field period of time in this manner corresponds to each field period of time for the image signal SVout sequentially output from the output processing section 305.

The audio output control section 307 also receives the synchronous signals SYNCc and SYNCd from the output processing section 305. The audio output control section 307 also receives the input audio signal SAin (SAa) corresponding to the input image signal SVin. The audio output control section 307 acquires the field number IDa sent through the second line of the bus 310 for each field period of time. This audio output control section 307 outputs an audio signal SAout corresponding to each predetermined period of time for the image signal SVout output from the output processing section 305 based on this field number IDa and the foregoing field number IDv.

The image signal SVout output from the output processing section 305 is supplied to the display 308, and the display 308 displays an image by the image signal SVout. Further, the audio signal SAout output from the audio output control section 307 is supplied to the speaker 309, and the speaker outputs an audio by the audio signal SAout.

As described above, according to the apparatus 300 for processing an informational signal as shown in FIG. 9, the audio signal SAout corresponding to each predetermined period of time for the image signal SVout output from the output processing section 305 is output from the audio output control section 307, based on the field numbers IDv and IDa sent from the DRC processing section 301 (the input control section 302 and the audio input control section 303) through the bus 310 to the output processing section 305 (the output control section 306 and the audio output control section 307). In this manner, the image signal SVout and the audio signal SAout are synchronized with each other, and the lip synchronization is correctly adjusted.

Figure 12:
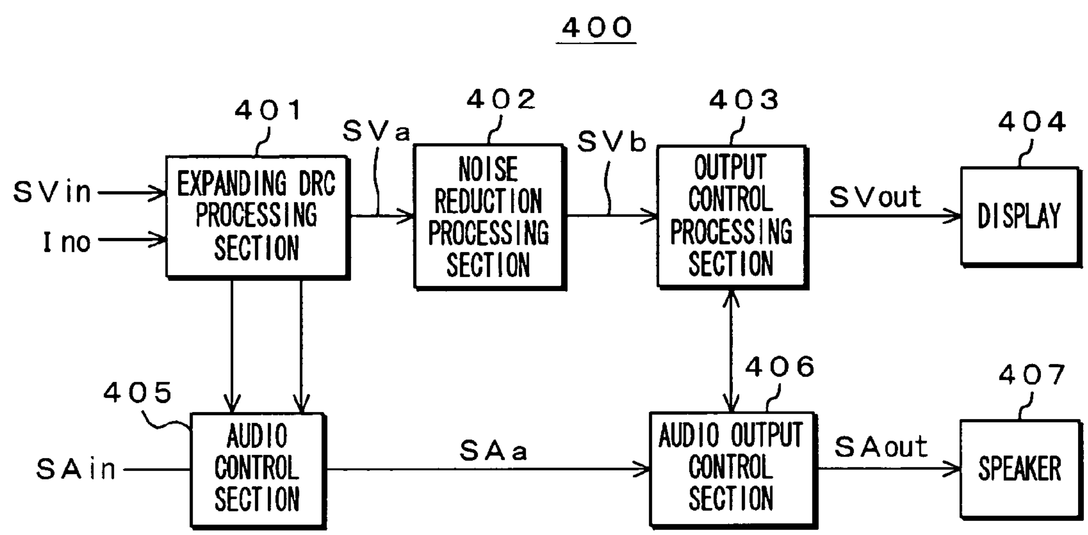
FIG. 12 is a block diagram for showing a configuration of an apparatus for processing an informational signal as a fourth embodiment of the invention.

Next, a fourth embodiment of the present invention will be described. FIG. 12 shows a configuration of an apparatus 400 for processing an informational signal as a fourth embodiment of the invention.

The apparatus 400 for processing an informational signal has an expanding DRC processing section 401, a noise reduction processing section 402, an output control processing section 403, and a display 404.

The expanding DRC processing section 401 constitutes an image processing section, and executes DRC processing (high-quality image processing) on an input image signal SVin to output a processed image signal to which an identifier as meta-information, in this embodiment, a field number (ID) is added for each field period of time. For example, a field number (ID) is inserted into a blanking period as shown in FIG. 6. Here, a signal path of the image signal constitutes transmitting device of a field number.

In the high-quality image processing, for example, an SD signal as an input image signal SVin is converted into an HD signal. This high-quality image processing is the same as the high-quality image processing executed in the DRC processing section 101 of the apparatus 100 for processing an informational signal as shown in FIG. 1. The noise reduction processing section 402 executes noise reduction on the output image signal of the expanding DRC processing section 401.

The output control processing section 403 constitutes an image output processing section and executes output processing on the image signal output from the noise reduction processing section 402. In this case, a field number which is added to the input image signal is separated from the input image signal for each field period of time and each image signal of the field period of time corresponding to thus-separated field number is sequentially output.

The display 404 is constituted by a display element such as a liquid crystal display (LCD), and displays an image by the image signal SVout output from the output control processing section 403.

The apparatus 400 for processing an informational signal also has an audio control section 405, an audio output control section 406, and a speaker 407.

Figure 13A:
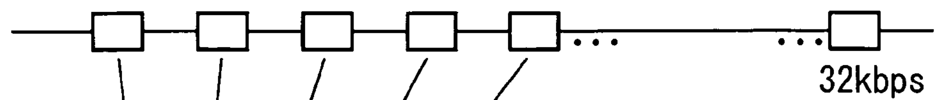
FIGS. 13A and 13B are block diagrams for respectively showing an added state of a field number in an audio signal.
Figure 13B:
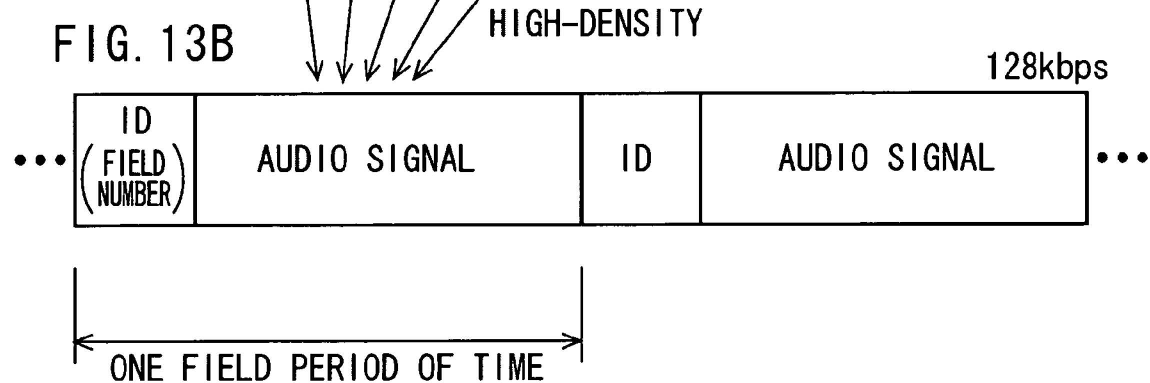

The audio control section 405 constitutes an audio processing section and outputs an audio signal SAa to which an identifier, in this embodiment, a field number, of the input audio signal SAin corresponding to the foregoing input image signal SVin is added, in correspondence with each field period of time for the image signal SVin. The identifier is identical to that is added for each field period of time for the image signal SVin. For example, as shown in FIG. 13A, 32 kbps intermittent audio data is highly densified every field period of time into 128 kbps audio data as shown in FIG. 13B. Then, a field number (ID) is inserted into the 128 kbps audio data utilizing a free time region. Here, a signal path of the audio signal constitutes transmitting device of the field number.

The audio output control section 406 constitutes an audio output processing section and executes any output processing on the audio signal SAa output from the audio control section 405. In this case, a field number which is added to the input audio signal is separated from the input audio signal for each field period of time, and based on this field number and the field number separated from the image signal in the foregoing output control processing section 403, an audio signal SAout corresponding to each field period of time for the image signal SVout output from the output control processing section 403 is output.

The speaker 407 outputs an audio by the audio signal SAout output from the audio output control section 406.

The following will describe detailed configurations of the expanding DRC processing section 401 and the audio control section 405. FIG. 14 shows the detailed configurations of the expanding DRC processing section 401 and the audio control section 405.

The expanding DRC processing section 401 has a determining section 411, a switch (SW) 412, a field number separating section 413, a high-quality image processing section 414, a synthesizing section 415, a field number generating section 416, a write processing section 417, a FIFO section 418, a field number read processing section 419, an input synchronous signal extracting section 420, and an output synchronous signal generating section 421.

The determining section 411 determines, based on additional information Ino for number, whether or not a field number has already been added to an input image signal SVin and an input audio signal SAin. The additional information Ino for number is information indicative of whether or not a field number has already been added to an input image signal SVin and an input audio signal SAin for each field period of time.

The switch 412 switches, based on the result of the determination by the determining section 411, between a supply of the input image signal SVin to the high-quality image processing section 414 and that to the field number separating section 413. That is, the switch 412 supplies the input image signal SVin to the field number separating section 413 when the input image signal SVin has a field number added thereto, whereas the switch 412 supplies the input image signal SVin to the high-quality image processing section 414 when the input image signal SVin has no field number added thereto.

The field number separating section 413 separates a field number from the input image signal SVin to which the field number is added for each field period of time, and at the same time, supplies the image signal from which the field number is separated to the high-quality image processing section 414. The high-quality image processing section 414 executes DRC processing (high-quality image processing) on the input image signal.

The input synchronous signal extracting section 420 extracts a synchronous signal from the input image signal SVin. The field number generating section 416 generates field numbers, which are sequentially incremented every field period of time, based on the result of the determination by the determining section 411 in synchronization with the synchronous signal extracted in the input synchronous signal extracting section 420. In this case, the field number generating section 416 generates a field number when the input image signal SVin has no field number added thereto.

The write processing section 417 writes the field number separated in the field number separating section 413 or the field number generated in the field number generating section 416 into the FIFO section 418 for each field period of time. The field number read processing section 419 reads the field number from the FIFO section 418 based on the synchronous signal generated in the output synchronous signal generating section 421, and supplies the read field number to the synthesizing section 415.

The synthesizing section 415 inserts a field number into a blanking period of the image signal after being subjected to the high-quality image processing in the high-quality image processing section 414, and outputs a processed image signal SVa to which a field number is added in synchronization with the synchronous signal generated in the output synchronous signal generating section 421.

Here, a size of the FIFO section 418 depends on the processing period of time in the high-quality image processing section 414. That is, the size of the FIFO section 418 is set in such a manner that the field number corresponding to each field period of time for the output image signal of the high-quality image processing section 414 is supplied from the field number read processing section 419 to the synthesizing section 415 for each field period of time.

The audio control section 405 has a switch 422, a field number separating section 423, a high-density processing section 424, a synthesizing section 425, a field number receiving section 426, a write processing section 427, a FIFO section 428, and a field number read processing section 429.

The switch 422 switches, based on the result of the determination made by the determining section 411 of the expanding DRC processing section 401, between a supply of the input audio signal SAin to the high-density processing section 424 and that to the field number separating section 423. That is, the switch 422 supplies the input audio signal SAin to the field number separating section 423 when the input audio signal SAin has a field number added thereto, whereas the switch 422 supplies the input audio signal SAin to the high-density processing section 424 when the input audio signal SAin has no field number added thereto.

The field number separating section 423 separates a field number from the input audio signal SAin to which a field number is added for each field period of time, and at the same time, supplies the audio signal from which the field number is separated to the high-density processing section 424. The high-density processing section 424 executes a high-density processing on the input audio data (see FIG. 13B) for each field period of time, to insert the field number thereinto.

The field number receiving section 426 receives a field number generated in the field number generating section 416 of the expanding DRC processing section 401. The write processing section 427 writes the field number separated in the field number separating section 423 or the field number received in the field number receiving section 426 into the FIFO section 428 for each field period of time. The field number read processing section 429 reads the field number from the FIFO section 428 based on the synchronous signal generated in the output synchronous signal generating section 421 of the expanding DRC processing section 401, and supplies the read field number to the synthesizing section 425. The synthesizing section 425 inserts the field number into a free-time region of the audio signal which is highly densified and is formed with the free-time region for each field period of time, and outputs an audio signal SAa to which the field number is added.

Here, a size of the FIFO section 428 depends on the processing period of time in the high-density processing section 424. That is, the size of the FIFO section 428 is set in such a manner that field number corresponding to each field period of time for the output image signal of the high-density processing section 424 is supplied from the field number read processing section 429 to the synthesizing section 425 for each field period of time.

The following will describe operations of the expanding DRC processing section 401 and the audio control section 405.

An input image signal SVin is supplied to the switch 412, and at the same time, is supplied to the input synchronous signal extracting section 420. When the input image signal SVin has no field number added thereto, the input image signal SVin is supplied to the high-quality image processing section 414 via the switch 412. Further, the field number generating section 416 generates field numbers in synchronization with the synchronous signal extracted in the input synchronous signal extracting section 420 with the field numbers being sequentially incremented every field period of time.

On the other hand, when the input image signal SVin has a field number added thereto, the input image signal SVin is supplied to the field number separating section 413 via the switch 412. This field number separating section 413 separates the field number from the input image signal SVin and supplies the image signal from which the field number is separated to the high-quality image processing section 414. The high-quality image processing section 414 then executes DRC processing (high-quality image processing) on the input image signal and supplies the processed image signal to the synthesizing section 415.

Further, the field number separated in the field number separating section 413 or the field number generated in the field number generating section 416 is written into the FIFO section 418 through the write processing section 417. The field number read processing section 419 receives the synchronous signal from the output synchronous signal generating section 421. The field number read processing section 419 reads the field number from the FIFO section 418 based on the synchronous signal, and supplies it to the synthesizing section 415. In this case, a field number corresponding to each field period of time for the output image signal of the high-quality image processing section 414 is supplied from the field number read processing section 419 to the synthesizing section 415 for each period of time.

The synthesizing section 415 then inserts the field number into the blanking period of the image signal after being subjected to the high-quality image processing in the high-quality image processing section 414. Then, the synthesizing section 415 outputs the processed image signal SVa to which the field number is added in synchronization with the synchronous signal generated in the output synchronous signal generating section 421.

The input audio signal SAin is supplied to the switch 422. To this switch 422, the result of the determination made by the determining section 411 of the expanding DRC processing section 401 is also supplied. When this input audio signal SAin has no field number added thereto, the input audio signal SAin is supplied to the high-quality processing section 424 via the switch 422. Further, the field number receiving section 426 receives the field number generated in the field number generating section 416 of the expanding DRC processing section 401.

On the other hand, when the input audio signal SAin has a field number added thereto, the input audio signal SAin is supplied to the field number separating section 423 via the switch 422. The field number separating section 423 separates the field number from the input audio signal SAin and supplies the audio signal from which the field number is separated to the high-density processing section 424.

The high-density processing section 424 executes any high-density processing on the input audio signal. However, when the input audio signal SAin has a field number already added thereto, the audio signal input into the high-density processing section 424 is already in a highly densified state. The highly densified audio signal is supplied to the synthesizing section 425.

Further, the field number received in the field number receiving section 426 is written into the FIFO section 428 through the write processing section 427. The field number read processing section 429 receives the synchronous signal from the output synchronous signal generating section 421 of the expanding DRC processing section 401. The field number read processing section 429 reads the field number from the FIFO section 428 based on the synchronous signal and supplies it to the synthesizing section 425. In this case, a field number corresponding to each field period of time for the output audio signal of the high-density processing section 424 is supplied from the field number read processing section 429 to the synthesizing section 425 for each period of time.

The synthesizing section 425 inserts the field number into a free-time region of each field period of time for the audio signal after being subjected to the high-density processing in the high-density processing section 424. Then, the synthesizing section 425 outputs the processed audio signal SAa to which the field number is added in synchronization with the synchronous signal generated in the output synchronous signal generating section 421 of the expanding DRC processing section 401.

Figure 15:
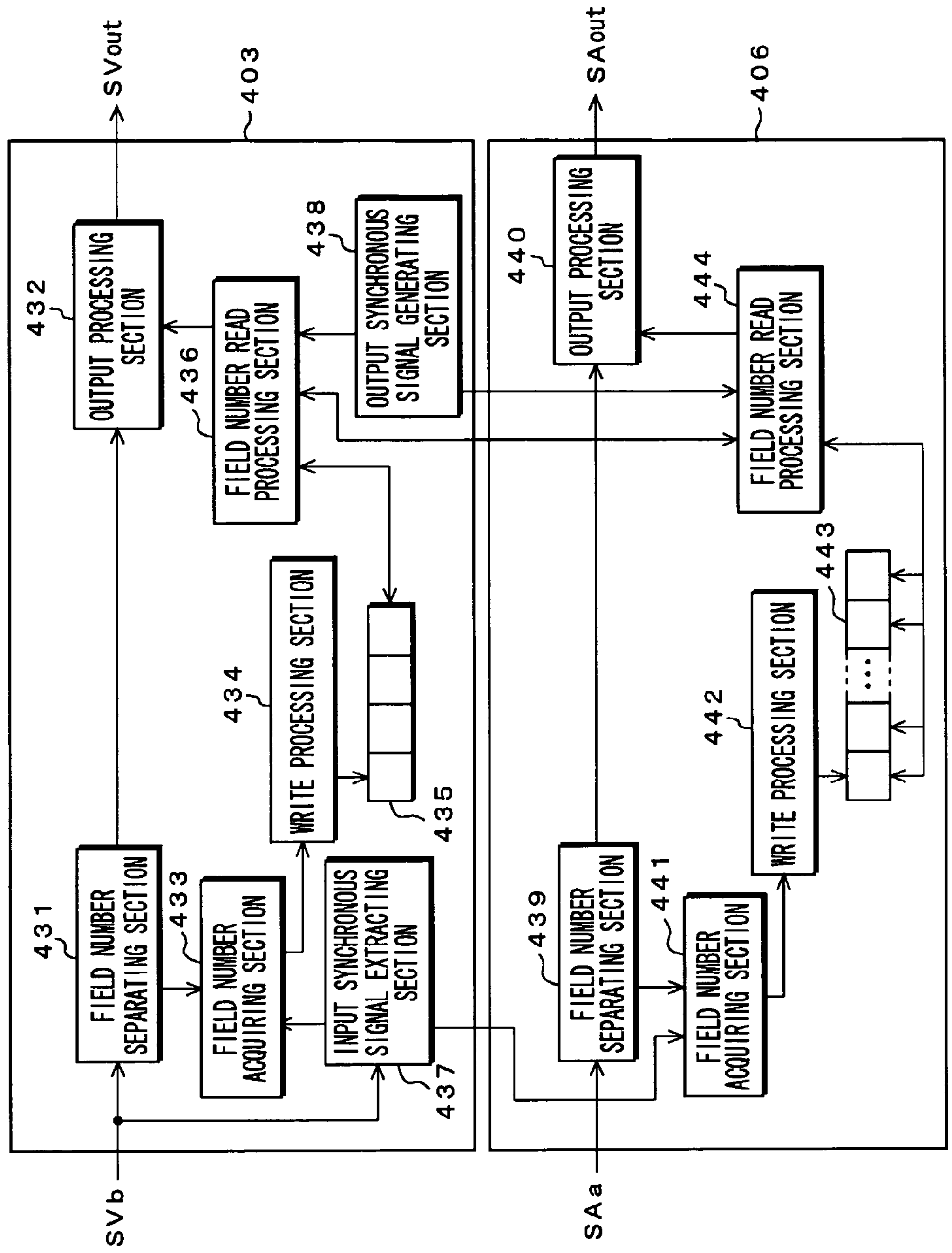
FIG. 15 is a block diagram for showing detailed configurations of an output control processing section and an audio output control section.

The following will describe detailed configurations of the output control processing section 403 and the audio output control section 406. FIG. 15 shows the detailed configurations of the output control processing section 403 and the audio output control section 406.

The output control processing section 403 has a field number separating section 431, an output processing section 432, a field number acquiring section 433, a write processing section 434, a FIFO section 435, a field number read processing section 436, an input synchronous signal extracting section 437, and an output synchronous signal generating section 438.

The field number separating section 431 separates a field number (ID) from the input image signal SVb to which the field number is added for each field period of time, and at the same time, supplies the image signal from which the field number is separated to the output processing section 432. The output processing section 432 outputs the output image signal SVout to be supplied to the display 404, based on the image signal supplied from the field number separating section 431.

The input synchronous signal extracting section 437 extracts a synchronous signal from the input image signal SVb. The field number acquiring section 433 acquires the field number separated in the field number separating section 431 at the timing of the synchronous signal extracted in the input synchronous signal extracting section 437.

The write processing section 434 writes the field number acquired in the field number acquiring section 433 into the FIFO section 435 for each field period of time. The field number read processing section 436 read the field number from the FIFO section 435 based on the synchronous signal generated in the output synchronous signal generating section 438. Here, a size of the FIFO section 435 depends on the processing period of time in the output processing section 432. That is, the size of the FIFO section 435 is set in such a manner that a field number corresponding to each field period of time for the output image signal of the output processing section 432 is read from the FIFO section 435 for each period of time.

The audio output control section 406 has a field number separating section 439, an output processing section 440, a field number acquiring section 441, a write processing section 442, a FIFO section 443, and a field number read processing section 444.

The field number separating section 439 separates a field number (ID), for each field period of time, from the input audio signal SAa to which the field number is added, and at the same time, supplies the audio signal from which the field number is separated to the output processing section 440. The output processing section 440 outputs the output audio signal SAout to be supplied to the speaker 407.

The field number acquiring section 441 acquires the field number separated in the field number separating section 439 at the timing of the synchronous signal extracted in the input synchronous signal extracting section 437 of the output control processing section 403.

The write processing section 442 writes the field number acquired in the field number acquiring section 441 into the FIFO section 443 for each field period of time. The field number read processing section 444 reads field numbers of plural field periods of time from the respective stages of the FIFO section 443, based on the synchronous signal generated in the output synchronous signal generating section 438 of the output control processing section 403. Here, the number of the stages of the FIFO section 443 is set in such a manner that the field number read from the foregoing FIFO section 435 by the field number read processing section 436 exists in the field numbers of plural field periods of time that are read from the respective stages of the FIFO section 443.

Further, the field number read processing section 444 confirms that the field number coinciding with the field number read by the field number read processing section 436 exists in the field numbers of plural field periods of time, and controls the output processing section 440 to output the audio signal of the field period of time corresponding to that field number. For reference, the output processing section 440 has a buffer, and the audio signal of each field period of time corresponding to the field number held in each stage of the FIFO section 443 is held in the buffer.

The following will describe operations of the output control processing section 403 and the audio output control section 406.

The input image signal SVb is supplied to the field number separating section 431, and at the same time, is supplied to the input synchronous signal extracting section 437. The field number separating section 431 separates the field number from the input image signal SVb, and supplies the image signal from which the field number is separated to the output processing section 432. Then, the output processing section 432 outputs the output image signal SVout.

The field number separated in the field number separating section 431 is supplied to the field number acquiring section 433. The field number acquiring section 433 acquires the field number based on the synchronous signal extracted in the input synchronous signal extracting section 437. The field number acquired in the field number acquiring section 433 is written into the FIFO section 435 through the write processing section 434. Then, the field number read processing section 436 reads the field number from the FIFO section 435 for each field period of time, based on the synchronous signal generated in the output synchronous signal generating section 438.

Here, the field number read by the field number read processing section 436 for each field period of time corresponds to the image signal output from the output processing section 432.

Further, the input audio signal SAa is supplied to the field number separating section 439. The field number separating section 439 separates the field number from the input audio signal SAa and supplies the audio signal from which the field number is separated to the output processing section 440. Then, the output processing section 440 outputs the output audio signal SAout.

The field number separated in the field number separating section 439 is supplied to the field number acquiring section 441. The field number acquiring section 441 acquires the field number based on the synchronous signal extracted in the input synchronous signal extracting section 437. The field number acquired in the field number acquiring section 441 is written into the FIFO section 443 through the write processing section 442. Then, the field number read processing section 444 reads the field numbers of plural field periods of time from the respective stages of the FIFO section 443, based on the synchronous signal generated in the output synchronous signal generating section 438.

Further, the field number read processing section 444 confirms that a field number coinciding with the field number read from the FIFO section 435 by the field number read processing section 436 exists in the field numbers of plural field periods of time, and the output processing section 440 is controlled to output the audio signal of the field period corresponding to the field number.

The following will describe operations of the apparatus 400 for processing an informational signal as shown in FIG. 12.

The input image signal SVin is supplied to the DRC processing section 401. This expanding DRC processing section 401 performs DRC processing (high-quality image processing) on the input image signal Svin. An image signal SVa to which the field number is added for each field period of time is obtained by the expanding DRC processing section 401. The processed image signal SVa is subjected to any noise reduction in the noise reduction processing section 402, and then, is supplied to the output control processing section 403. Then, the output control processing section 403 outputs the output image signal SVout to the display 404, and the display 404 displays an image by this output image signal SVout.

The input audio signal SAin is supplied to the audio control section 405. This audio control section 405 obtains the audio signal SAa to which the field number is added which is identical to that added for each field period of time for the image signal SVin in correspondence with each field period of time for the image signal SVin of the input audio signal SAin. This audio signal SAa is supplied to the audio output control section 406.

The audio output control section 406 outputs the output audio signal SAout corresponding to each field period of time for the output image signal SVout output from the output control processing section 403 based on the field number separated from the image signal SVb in the foregoing output control processing section 403 and the field number separated from the audio signal SAa. This output audio signal SAout is supplied to the speaker 407, and the speaker 407 outputs an audio by the output audio signal SAout.

As described above, according to the apparatus 400 for processing an informational signal as shown in FIG. 12, based on the field numbers respectively added to the image signal and the audio signal, the audio output control section 406 can output an audio signal SAout corresponding to each predetermined period of time for the image signal SVout output from the output control processing section 403. In this manner, the image signal SVout and the audio signal SAout are synchronized with each other, and the lip synchronization is correctly adjusted.

Figure 16:
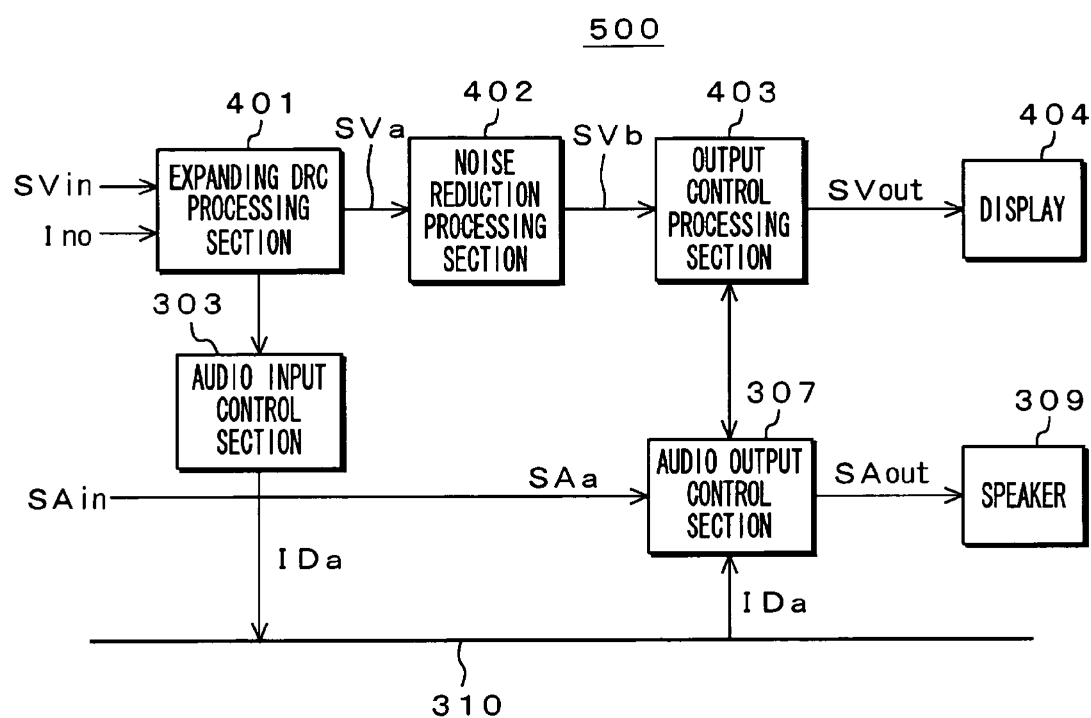
FIG. 16 is a block diagram for showing a configuration of an apparatus for processing an informational signal as a fifth embodiment of the invention.

Next, a fifth embodiment of the present invention will be described. FIG. 16 shows a configuration of an apparatus 500 for processing an informational signal as a fifth embodiment of the invention. In FIG. 16, the elements corresponding to those shown in FIGS. 9 and 12 are denoted by the same reference numerals, detailed explanation of which will be omitted properly.

The apparatus 500 for processing an informational signal has an expanding DRC processing section 401, a noise reduction processing section 402, an output control processing section 403, and a display 404. These elements are the same as those of the apparatus 400 for processing an informational signal as shown in FIG. 12. Further, the apparatus 500 for processing an informational signal also has an audio input control section 303, an audio output control section 307, a speaker 309, and a bus 310. The elements are the same as those of the apparatus 300 for processing an informational signal as shown in FIG. 9.

FIG. 17 shows configurations of the expanding DRC processing section 401 and the audio input control section 303. In FIG. 17, the elements corresponding to those of FIGS. 10 and 14 are denoted by the same reference numerals, detailed explanation of which will be properly omitted.

The expanding ERC processing section 401 has, similar to the case of the expanding DRC processing section 401 in the apparatus 400 for processing an informational signal as shown in FIG. 14, a determining section 411, a switch (SW) 412, a field number separating section 413, a high-quality image processing section 414, a synthesizing section 415, a field number generating section 416, a write processing section 417, a FIFO section 418, a field number read processing section 419, an input synchronous signal extracting section 420, and an output synchronous signal generating section 421.

Further, the audio input control section 303 has, similar to the case of the audio input control section 303 in the apparatus 300 for processing an informational signal as shown in FIG. 10, a field number receiving section 331, a write processing section 332, a FIFO section 333, and a field number read processing section 334.

Although in FIG. 10, the field number receiving section 331 has received the field number generated in the field number generating section 321 of the input control section 302, the field number receiving section 331 of this embodiment receives the field number generated in the field number generating section 416 of the expanding DRC processing section 401. Further, although in FIG. 10, the field number read processing section 334 has read the field number based on the synchronous signal SYNCb from the DRC processing section 301, the field number read processing section 334 of this embodiment reads the field number based on the synchronous signal generated in the output signal generating section 421 of the expanding DRC processing section 401.

The operations of the expanding DRC processing section 401 are the same as those explained in FIG. 14. The synthesizing section 415 inserts a field number into the blanking period if the image signal after being subjected to the high-quality image processing in the high-quality image processing section 414. The synthesizing section 415 also outputs a processed image signal SVa to which a field number is added in synchronization with the synchronous signal generated in the output synchronous signal generating section 421.

Further, the operations of the audio input control section 303 are the same as those explained in FIG. 10. The field number received in the field number receiving section 331 is written into the FIFO section 333 through the write processing section 332. Then, the field number read processing section 334 reads the field number IDa from the FIFO section 333 and sends it to the bus 310.

Figure 18:
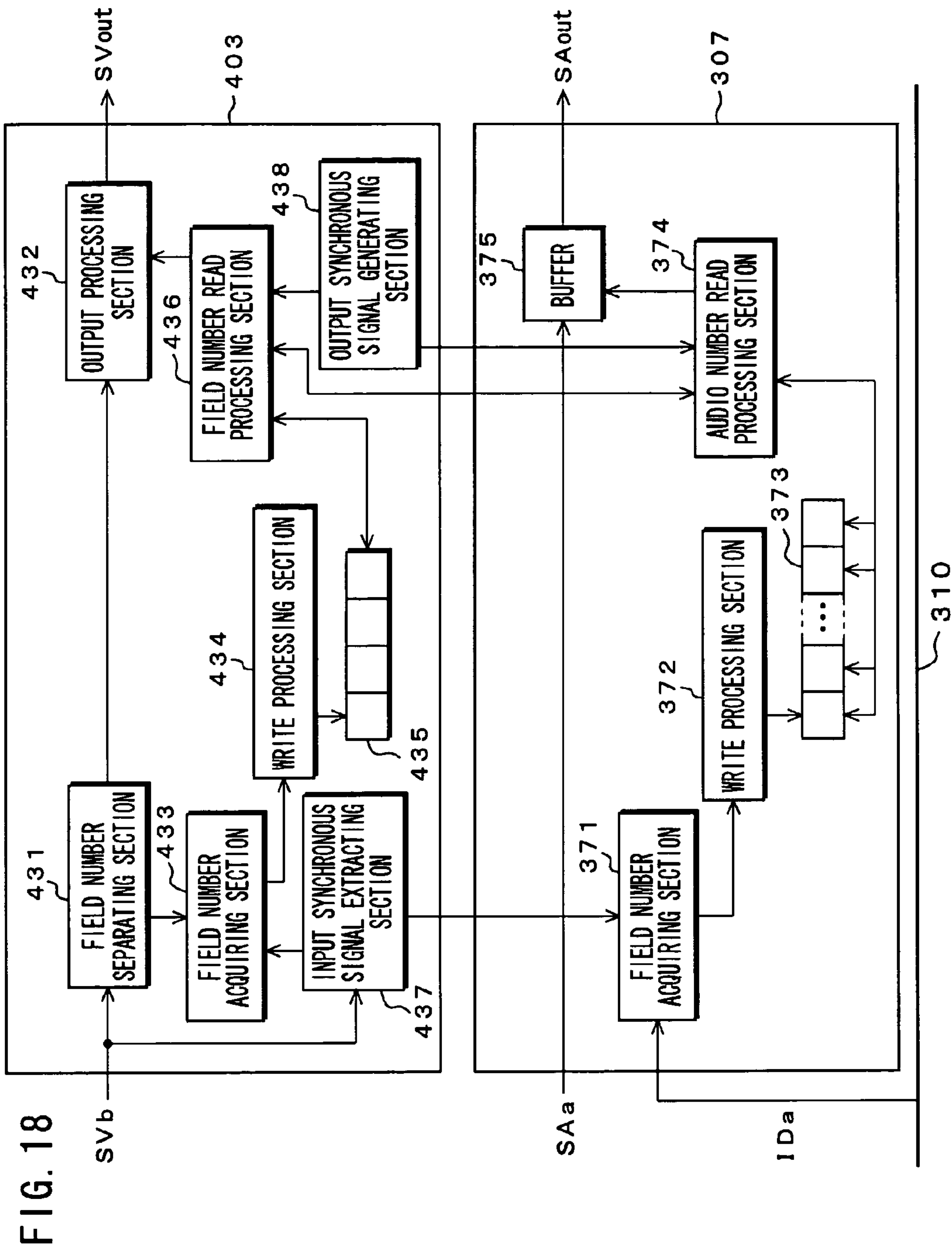
FIG. 18 is a block diagram for showing detailed configurations of an output control processing section and an audio output control section.

FIG. 18 illustrates detailed configurations of the output control processing section 403 and the audio output control section 307. In FIG. 18, the elements corresponding to those of FIGS. 11 and 15 are denoted by the same reference numerals, detailed explanation of which will be properly omitted.

The output control processing section 403 has, similar to the case of the output control processing section 403 in the apparatus 400 for processing an informational signal as shown in FIG. 15, a field number separating section 431, an output processing section 432, a field number acquiring section 433, a write processing section 434, a FIFO section 435, a field number read processing section 436, an input synchronous signal extracting section 437, and an output synchronous signal generating section 438.

Further, the audio output control section 307 has, similar to the case of the audio output control section 307 in the apparatus 300 for processing an informational signal as shown in FIG. 11, a field number acquiring section 371, a write processing section 372, a FIFO section 373, an audio number processing section 374, and a buffer 375.

Although in FIG. 11, the field number acquiring section 371 has acquired the field number IDa from the bus 310 based on the synchronous signal SYNCc supplied from the output processing section 305, the field number acquiring section 371 of this embodiment acquires a field number IDa from the bus 310 based on the synchronous signal extracted in the input synchronous signal extracting section 437 in the output control processing section 403. Further, although in FIG. 11, the audio number processing section 374 has read the field numbers from the respective stages of the FIFO section 373 based on the synchronous signal SYNCd supplied from the output processing section 305 and at the same time, executes any processing using the field number read in the image number read processing section 364 of the output control section 306, in this embodiment, the audio number processing section 374 reads the field numbers from the respective stages of the FIFO section 373 based on the synchronous signal generated in the synchronous signal generating section 438 of the output control section 403, and at the same time, executes any processing using a field number read in the field number read processing section 436 of the output control processing section 403.

The operations of the output control processing section 403 are the same as those explained in FIG. 15. The output processing section 432 outputs an output image signal SVout. Further, the field number read processing section 436 reads field numbers corresponding to the respective field periods of time for the image signal output from the output processing section 432 sequentially from the FIFO section 435.

Further, the operations of the audio input control section 307 are the same as those explained in FIG. 11. That is, the field number acquiring section 371 acquires a field number IDa from the bus 310 for each field period of time. The field number IDa is written into the FIFO section 373 through the write processing section 372. Then, the audio number processing section 374 reads field numbers IDa of plural field periods of time from the respective stages of the FIFO section 373. Then, the field number read processing section 436 confirms that a field number coinciding with the field number read from the FIFO section 435 exists in the field numbers IDa of plural field periods of time, and the buffer 375 is controlled to output the audio signal of the field period of time corresponding to the field number.

The following will describe operations of the apparatus 500 for processing an informational signal as shown in FIG. 16.

The input image signal SVin is supplied to the expanding DRC processing section 401. The expanding DRC processing section 401 executes DRC processing (high-quality image processing) on the input image signal SVin, and obtains the processed image signal SVa to which the field number is added for each field period of time. The processed image signal SVa is subjected to noise reduction in the noise reduction processing section 402, and then, is supplied to the output control processing section 403. Then, the output control processing section 403 outputs the output image signal SVout to the display 404. The display 404 displays an image by the output image signal SVout.

The input audio signals SAin (SAa) corresponding to the input image signal SVin is supplied to the audio output control section 307. The audio output control section 307 acquires the field number IDa sent through the bus 310 for each field period of time. The audio output control section 307 outputs the audio signal SAout corresponding to each predetermined period of time for the image signal SVout output from the output control processing section 403 based on the foregoing field number IDa and the field number separated from the image signal in the output control processing section 403. This audio signal SAout is supplied to the speaker 309, and the speaker 309 outputs an audio by the audio signal SAout.

According to the apparatus 500 for processing an informational signal as shown in FIG. 16, the audio output control section 307 can output the audio signal SAout corresponding to each predetermined period of time for the image signal SVout output from the output control processing section 403, based on the field number added to the image signal and the field number IDa sent from the expanding DRC processing section 301 through the bus 310. In this manner, the image signal SVout and the audio signal SAout are synchronized with each other, and the lip synchronization is correctly adjusted.

Although the foregoing embodiments have respectively illustrated cases where a predetermined period is a field period of time, the present invention is not limited to this. Alternatively, a predetermined period may be plural field periods of time. Further, although the foregoing embodiments have respectively illustrated that meta-information corresponding to each predetermined period of time is a field number as an identifier for identifying a field, or information on a kinds of signal for identifying which the signal is an image signal or a non-image signal, the present invention is not limited to this. Alternatively, for example, time information is transmitted as meta-information from the first processing section to the second processing section, and processing utilizing this time information can be executed in the second processing section.

The apparatus and method for processing an informational signal related to the above embodiments of the present invention can be utilized as a processing apparatus in which plural pieces of processing can be executed on an informational signal such as image signal and audio signal.

It should be understood by those skilled in the art that various modifications, combinations, sub-combinations and alternations may occur depending on design requirements and other factors insofar as they are within the scope of the appended claims or the equivalents thereof.

What is claimed is:

1. An apparatus for processing an informational signal, said apparatus comprising:

a first processing section configured to receive the informational signal, execute image processing on the informational signal, and output the processed informational signal;

a second processing section, which is located at a posterior stage of the first processing section, configured to receive the processed informational signal and execute output processing on the processed informational signal; and a transmitting device configured to transmit meta-information corresponding to each predetermined period of time in the informational signal, from the first processing section to the second processing section, wherein the processing in the second processing section is controlled based on the meta-information transmitted by the transmitting device, the meta-information contains information on kinds of signal indicating that the received informational signal is any one of an image signal and a non-image signal, and the second processing section is configured to output the received informational signal when the information on the kind of signal is indicative of the image signal, whereas the second processing section is configured to output a blanking signal when the information on the kinds of signal is indicative of the non-image signal.

2. A method for processing an informational signal in which image processing is executed in a first processing section, and output processing is executed in a second processing section located at a posterior stage of the first processing section, said method comprising:

transmitting meta-information corresponding to each predetermined period of time in the informational signal from the first processing section to the second processing section;

controlling the processing in the second processing section based on the transmitted meta-information, wherein the meta-information contains information on kinds of signal indicating that the received informational signal is any one of an image signal and a non-image signal; and outputting the received informational signal from the second processing section when the information on the kind of signal is indicative of the image signal, and outputting a blanking signal from the second processing section when the information on the kinds of signal is indicative of the non-image signal.

3. An apparatus for processing an informational signal, said apparatus comprising:

a first processing section configured to receive the informational signal, execute image processing on the informational signal, and output the processed informational signal;

an additional-information-generating section configured to generate additional information for each predetermined period of time in the processed informational signal output from the first processing section;

a transmitting path configured to transmit the additional information generated in the additional-information-generating section;

a second processing section, which is located at a posterior stage of the first processing section, configured to receive the processed informational signal, and execute output processing on the processed informational signal; and an additional-information-acquiring section configured to acquire the additional information from the transmitting path, wherein the processing in the second processing section is controlled for each predetermined period of time based on the additional information acquired in the additional-information-acquiring section, the additional information contains information on kinds of signal indicating that the received informational signal is any one of an image signal and a non-image signal, and the second processing section is configured to output the received informational signal when the information on the kind of signal is indicative of the image signal, whereas the second processing section is configured to output a blanking signal when the information on the kinds of signal is indicative of the non-image signal.

4. An apparatus for processing an informational signal, said apparatus comprising:

a first processing section configured to receive the informational signal, execute image processing on the received informational signal, and output the processed informational signal to which an identifier is added for each predetermined period of time;

an additional-information-generating section configured to generate additional information including the identifier for each predetermined period of time in the processed informational signal output from the first processing section;

a transmitting path configured to transmit the additional information generated in the additional-information-generating section;

a second processing section, which is located at a posterior stage of the first processing section, configured to receive the processed informational signal, and execute output processing on the processed informational signal;

an additional-information-acquiring section configured to acquire the additional information from the transmitting path; and a separating section configured to separate the identifier added to the processed informational signal inputted to the second processing section for each predetermined period of time, wherein the processing in the second processing section for the informational signal for a predetermined period of time from which a predetermined identifier has been separated in the separating section is controlled based on the additional information containing the predetermined identifier among pieces of the additional information acquired in the additional-information-acquiring section.

5. The apparatus for processing an informational signal according to claim 4, wherein the additional information contains the identifier and information on kinds of signal indicating that the received informational signal is any one of an image signal and a non-image signal, and wherein the second processing section is configured to output the received informational signal when the information on the kinds of signal is indicative of the image signal, whereas the second processing section is configured to output a blanking signal when the information on the kinds of signal is indicative of the non-image signal.

6. The apparatus for processing an informational signal according to claim 4, wherein the first processing section includes:

an identifier-generating section configured to sequentially generate different identifiers for each predetermined period of time when the received informational signal has no identifier added thereto, and a synthesizing section configured to add the identifier generated in the identifier-generating section for each predetermined period of time in the processed signal when the received informational signal has no identifier added thereto, to obtain a processed signal to which the identifier is added.

7. An apparatus for processing an informational signal, said apparatus comprising:

an image-processing section configured to receive an image signal, execute image processing on the received image signal and output the processed image signal;

an image-output-processing section, which is located at a posterior stage of the image-processing section, configured to receive the processed image signal and execute output processing on the processed image signal;

a first identifier-generating section configured to generate an identifier for each predetermined period of time in the image signal output from the image-processing section;

an audio-output-processing section configured to receive an audio signal corresponding to the image signal and execute output processing on the audio signal;

a second identifier-generating section configured to generate an identifier for the audio signal received by the audio-output-processing section, said identifier being identical to that generated in the first identifier-generating section for each predetermined period of time for the image signal in correspondence with each predetermined period of time for the image signal;

a transmitting path configured to transmit the identifier generated in the first identifier-generating section as a first identifier and transmit the identifier generated in the second identifier-generating section as a second identifier;

a first identifier-acquiring section configured to acquire the first identifier from said transmitting path; and a second identifier-acquiring section configured to acquire the second identifier from the transmitting path, wherein the image-output-processing section is configured to sequentially output an image signal of a predetermined period of time corresponding to the first identifier acquired in the first identifier-acquiring section; and the audio-output-processing section is configured to output an audio signal corresponding to each predetermined period of time for the image signal output from the image-output-processing section, based on the first identifier acquired in the identifier-acquiring section and the second identifier acquired in the identifier-acquiring section.

8. An apparatus for processing an informational signal, said apparatus comprising:

an image-processing section configured to receive an image signal, execute image processing on the received image signal, and output the processed signal to which an identifier is added for each predetermined period of time;

an audio-processing section configured to output an audio signal corresponding to the image signal received by the image-processing section, to which an identifier identical to the identifier added for each predetermined period of time for the image signal in correspondence with each predetermined period of time for the image signal is added;

an image-output-processing section, which is located at a posterior stage of the image- processing signal section, configured to receive the processed image signal and execute output processing on the received image signal;

an audio-output-processing section, which is located at a posterior stage of the audio-processing signal section, configured to receive an audio signal and execute output processing on the received audio signal;

a first separating section configured to separate an identifier added to the image signal received by the image-output-processing section therefrom as a first identifier; and a second separating section configured to separate an identifier added to the audio signal received by the audio-output-processing section therefrom as a second identifier;

wherein the image-output-processing section is configured to sequentially output an image signal for each predetermined period of time corresponding to the first identifier separated in the separating section, and the audio-output-processing section is configured to output an audio signal corresponding to each predetermined period of time for the image signal outputted from the image-output-processing section, based on the first identifier separated in the first separating section and the second identifier separated in the second separating section.

9. An apparatus for processing an informational signal, said apparatus comprising:

an image-processing section configured to receive an image signal, execute image processing on the received image signal, and output the processed signal to which an identifier is added for each predetermined period of time;

an image-output-processing section, which is located at a posterior stage of the image-processing signal section, configured to receive the processed image signal and execute output processing on the received image signal;

a separating section configured to separate an identifier added to the image signal received by the image-output-processing section therefrom as a first identifier;

an audio-output-processing section configured to receive an audio signal corresponding to the image signal and execute output processing on the audio signal;

an identifier-generating section configured to generate an identifier for the audio signal received by the audio-output-processing section, said identifier being identical to that added for each predetermined period of time for the image signal in correspondence with each predetermined period of time for the image signal;

a transmitting path configured to transmit an identifier generated in the identifier-generating section as a second identifier; and an identifier-acquiring section configured to acquire the second identifier from the transmitting path, wherein the image-output-processing section is configured to sequentially output an image signal for each predetermined period of time corresponding to the first identifier separated in the separating section, and the audio-output-processing section is configured to output an audio signal corresponding to each predetermined period of time for the image signal outputted from the image-output-processing section, based on the first identifier separated in the separating section and the second identifier acquired in the identifier-acquiring section.

* * * * *